(12) United States Patent
Kuboki

(10) Patent No.: US 8,345,321 B2
(45) Date of Patent: Jan. 1, 2013

(54) IMAGE INPUT AND OUTPUT USING SCAN-ALL-FIRST INPUT MODE

(75) Inventor: Keiju Kuboki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 345 days.

(21) Appl. No.: 12/257,515

(22) Filed: Oct. 24, 2008

(65) Prior Publication Data

US 2009/0051981 A1   Feb. 26, 2009

Related U.S. Application Data

(63) Continuation of application No. 10/438,103, filed on May 15, 2003, now Pat. No. 7,456,981.

(30) Foreign Application Priority Data

May 16, 2002   (JP) .................................. 2002-141625
Mar. 13, 2003   (JP) .................................. 2003-068113

(51) Int. Cl.
*H04N 1/04* (2006.01)
*G06F 3/12* (2006.01)
*G06K 15/00* (2006.01)
*G09G 5/00* (2006.01)
*G03B 27/62* (2006.01)

(52) U.S. Cl. ..... 358/474; 358/1.13; 358/1.14; 358/1.15; 345/619; 345/650; 355/75

(58) Field of Classification Search .................. 358/1.15, 358/1.13, 1.14, 1.9, 505, 540, 426.02, 474, 358/448, 452, 488; 345/619, 650; 355/75
See application file for complete search history.

(56) References Cited

U.S. PATENT DOCUMENTS

| | | | |
|---|---|---|---|
| 4,448,515 A * | 5/1984 | Ishikawa | 399/15 |
| 5,710,968 A * | 1/1998 | Clark et al. | 399/382 |
| 5,751,925 A | 5/1998 | Kataoka et al. | 395/115 |
| 6,213,652 B1 * | 4/2001 | Suzuki et al. | 358/1.15 |
| 6,268,927 B1 | 7/2001 | Lo et al. | 358/1.15 |
| 6,804,020 B1 * | 10/2004 | Kuroda | 358/1.15 |
| 6,850,995 B1 | 2/2005 | Shishizuka et al. | 710/20 |
| 6,999,198 B1 * | 2/2006 | Nakagiri et al. | 358/1.9 |
| 7,630,092 B1 * | 12/2009 | Suzuki et al. | 358/1.14 |
| 2002/0006291 A1 | 1/2002 | Kuboki | 399/82 |
| 2002/0018235 A1 * | 2/2002 | Ryan et al. | 358/1.15 |

\* cited by examiner

*Primary Examiner* — Steven Kau
*Assistant Examiner* — Neil R McLean
(74) *Attorney, Agent, or Firm* — Fitzpatrick, Cella, Harper & Scinto

(57) ABSTRACT

In processing documents, a scan-all-first mode is available, in which a set of documents is input part by part until all documents have been input, and, after completion of the input process, an output process is performed as a single job for the set of documents. In an intermediate state during the input process in which the set of documents is input part by part in the scan-all-first mode, a user is allowed to make settings of processing conditions associated with, for example, insertion of a sheet or insertion of a form image. In the job processed in the scan-all-first mode, insertion of the sheet or insertion of a composite image including the form image is performed according to the settings made in the intermediate state.

6 Claims, 32 Drawing Sheets

FIG. 6

```
1234 : (P1000) BEING SCANNED
              AUTOMATIC PAPER
              SELECTION
100%          A4              ESTIMATIE OUTPUT TIME    MIN

PAGES      COPIES            PRINTED NUMBER OF SHEETS
[ 2000 ] X [ 200/100 ] = [                    ]

REMAINING MEMORY  100%
                                LIGHT    DARK

[ CANCEL ]                      [ CLOSE ]
```

FIG. 12

| | PAGE OF ORIGINAL DOCUMENT | PAGE OF PRINTED DOCUMENT | FEEDER STAGE | PRINT MODE |
|---|---|---|---|---|
| 723 | 1 | 1 | NORMAL | NORMAL |
| | 2 | 2 | NORMAL | NORMAL |
| 724 | 3 | 3 | INSERTION SHEET | INSERT AND PRINT |
| | 4 | 4 | NORMAL | NORMAL |
| | 5 | 5 | NORMAL | NORMAL |
| 725 | | 6 | INSERTION SHEET | INSERT BUT DONT PRINT |
| 726 | 6 | 7 | NORMAL | NORMAL |
| | 7 | 8 | NORMAL | NORMAL |
| | ⋮ | ⋮ | ⋮ | |
| | ⋮ | ⋮ | | |
| | ⋮ | ⋮ | ⋮ | |
| | M | N | NORMAL | NORMAL |

719, 720, 721, 722

702

| PAGE OF ORIGINAL DOCUMENT | PAGE OF PRINTED DOCUMENT | FEEDER STAGE | PRINT MODE |
|---|---|---|---|
| 1 | 1 | NORMAL | NORMAL |
| 2 | 2 | NORMAL | NORMAL |
| 3 | 3 | NORMAL | COMBINE WITH FORM-1 IMAGE |
| 4 | 4 | NORMAL | NORMAL |
| 5 | 5 | NORMAL | NORMAL |
|  | 6 | NORMAL | INSERT FORM-2 IMAGE |
| 6 | 7 | NORMAL | NORMAL |
| 7 | 8 | NORMAL | NORMAL |
| ⋮ | ⋮ | ⋮ | ⋮ |
| M | N | NORMAL | NORMAL |

732 → row 3; 733 → row 6

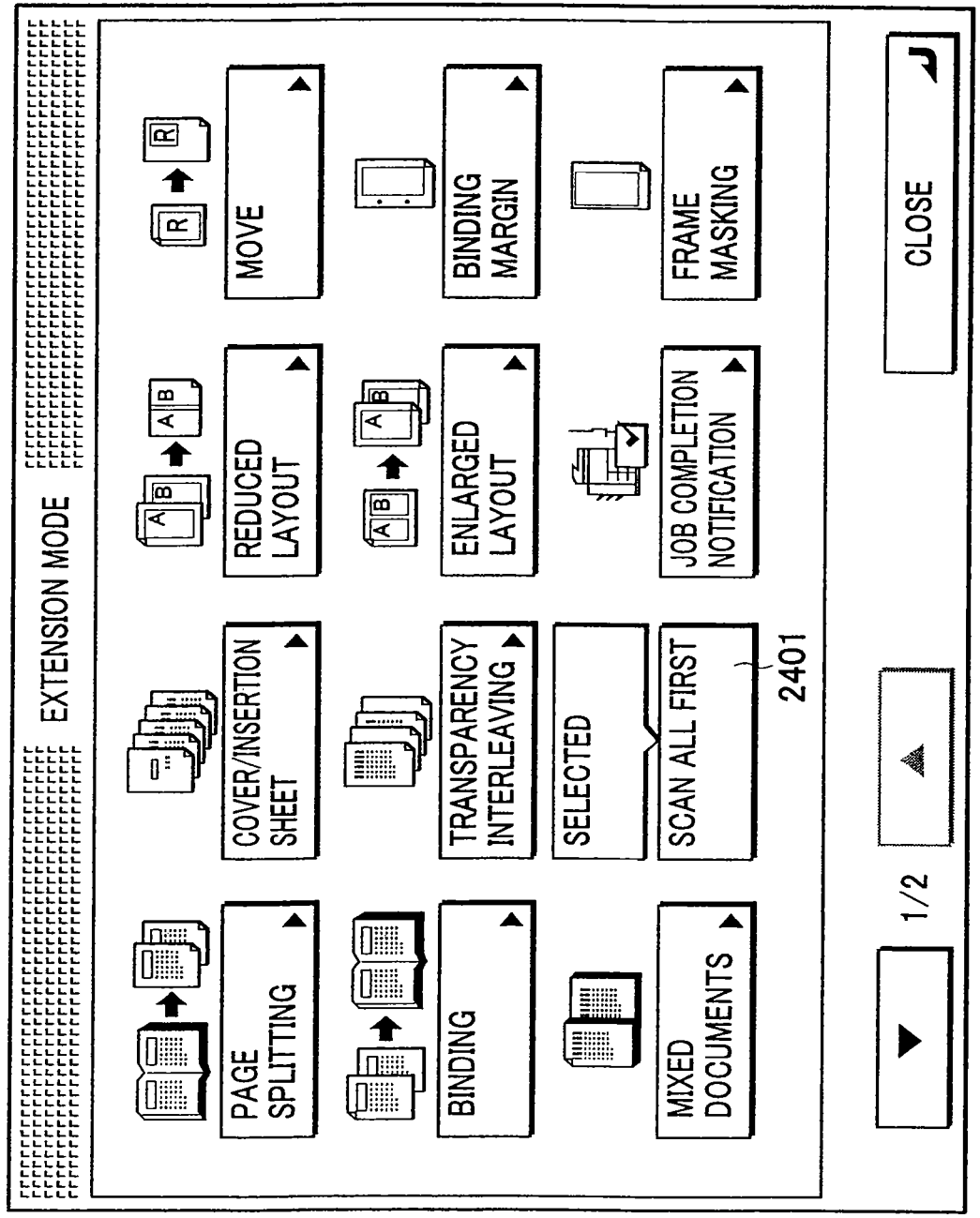

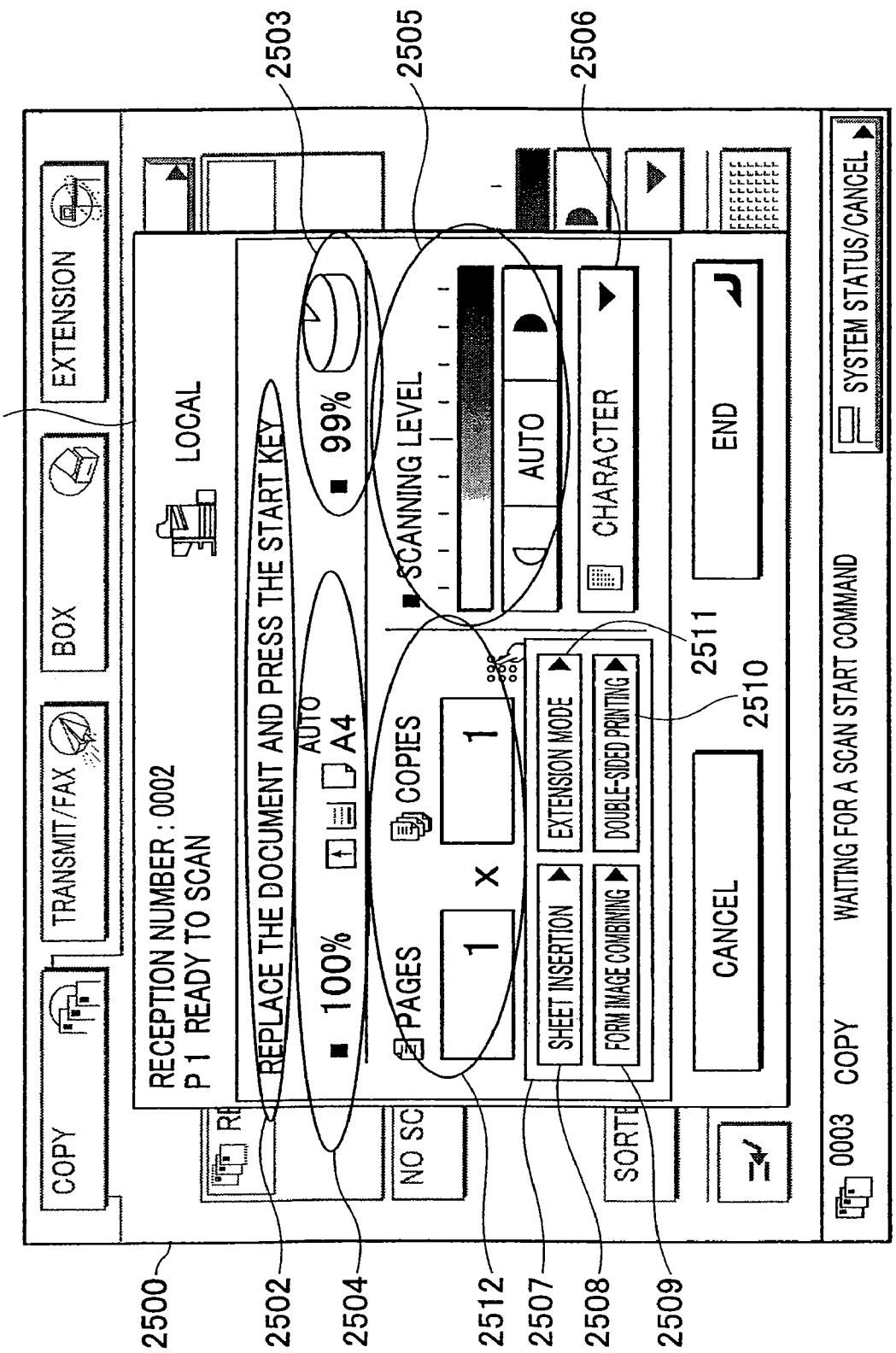

FIG. 26A

SELECTION OF COVER/INSERTION SHEET TYPE AND SHEET FEEDER

SELECT A COVER/INSERTION SHEET TYPE AND A SHEET FEEDER

| COVER SHEET | BACK COVER SHEET | INSERTION SHEET / CHAPTER SHEET |
|---|---|---|
| SHEET FEEDER A4 | SHEET FEEDER A4 | SHEET FEEDER A4 |
| PAPER TYPE | PAPER TYPE | PAPER TYPE |

CANCEL | RETURN | NEXT

FIG. 26C

PAGE SETTING FOR COVER/INSERTION SHEETS

INPUT PAGES AT WHICH TO PUT INSERTION/CHAPTER SHEETS, USING THE TEN-KEY PAD

| INSERTION/CHAPTER SHEET | | PAGE OF DOCUMENT |
|---|---|---|
| 1ST SHEET | ↑ | BEFORE PAGE OF 0 |
| 2ND SHEET | ↑ | BEFORE PAGE OF 0 |
| 3RD SHEET | ↑ | BEFORE PAGE OF 0 |
| 4TH SHEET | ↑ | BEFORE PAGE OF 0 |
| 5TH SHEET | ↑ | BEFORE PAGE OF 0 |
| 6TH SHEET | ↑ | BEFORE PAGE OF 0 |
| 7TH SHEET | ↑ | BEFORE PAGE OF 0 |
| 8TH SHEET | ↑ | BEFORE PAGE OF 0 |
| 9TH SHEET | ↑ | BEFORE PAGE OF 0 |

◀ 1/3 ▶

CANCEL  ▼ RETURN  OK

IMAGE INPUT AND OUTPUT USING SCAN-ALL-FIRST INPUT MODE

This application is a continuation application of copending U.S. patent application Ser. No. 10/438,103, filed May 15, 2003.

BACKGROUND OF THE INVENTION

1. Field of the Invention

The present invention relates to an image input/output apparatus such as a digital copying machine, an image input/output system, a method of controlling an image input/output apparatus or an image input/output system, a storage medium, an operation method of an image input/output system, and a method of displaying a user interface screen in an image input/output system.

2. Description of the Related Art

In recent years, image input/output apparatuses such as a digital copying machine and image input/output systems have been developed.

The digital copy machine reads an image by using a CCD into a digital image signal, performs various processes on the digital image signal, and converts the resultant image signal into a laser signal thereby recording an image on a recording medium by means of electrophotography.

It is known in the art to store an image signal in an image memory such as a hard disk and read it when an image is formed. In this technique, once an image signal obtained via a scanner is stored in the image memory, the image can be formed an arbitrary number of times. This technique is useful in particular because it makes it possible to perform electronic sorting.

In the art of digital copy machines, a sheet insertion mode has been proposed.

In the sheet insertion mode, when a set of document pages is printed, a special sheet (such as colored sheets) fed from a sheet tray that is different from a main sheet tray is inserted as an insertion sheet at a specified page. Herein, an insertion sheet may be simply inserted between pages on which document images are printed (but no image is printed on the insertion sheet itself), or an insertion sheet may be used for a particular page on which a document image is printed.

However, in the sheet insertion mode, a user has to set processing conditions in the sheet insertion mode (to specify at which page to insert an additional sheet and specify whether to print on the inserted sheet) before the apparatus starts inputting of document data to be processed in the sheet insertion mode. For example, the setting of processing conditions is performed during a preprocess in which various conditions including print conditions are input, so that processing in the sheet insertion mode is performed correctly. Also in the composite-with-form mode, as in the sheet insertion mode, users need to make settings associated with various processing conditions, such as selection of a form image to be combined or specifying of a document page with which to combine the form image, before the apparatus starts the operation in the composite-with-form mode. Thus, users have to decide all details of conditions associated with processing to be performed in a desired mode such as the sheet insertion mode or the composite-with-form mode and make settings associated with all processing conditions, before the apparatus starts processing on documents to be processed.

The above problems occur not only in the sheet insertion mode and the composite-with-form mode, but similar problems can also occur when the apparatus is operated in an output mode under specified output processing conditions. That is, users have to know information on all details of conditions associated with output processing to be performed and have to make settings associated with all processing conditions, before the apparatus starts processing.

In the conventional techniques, as described above, in a case in which processing is performed in a mode in which a user has to correctly set processing conditions depending on the content and/or the state of documents to be processed, users have to know all details of documents to be processed and have to decide and set all conditions associated with processing to be performed, before the processing is started, and thus users have to perform complicated and troublesome operations. The above problem becomes more serious when a large number of documents are processed. In particular, in the sheet insertion mode, users have to decide and specify at which document pages additional sheets should be inserted. Thus, users have to do very troublesome job when there are a great number of documents to be processed. In the composite-with-form mode, users also have to select a form image to be combined and decide a position at which the form image is to be put, and have to make settings according to the decision, and thus users also have to do very troublesome job in particular when there are a great number of documents to be processed.

SUMMARY OF THE INVENTION

It is an object of the present invention to provide an image input/output apparatus, an image input/output system, a method of controlling an image input/output apparatus, a method of controlling an image input/output system, a storage medium, an operation method for an image input/output system, and a method of displaying a user interface screen for use in an image input/output system, which solve the aforementioned problems of the conventional techniques.

It is another object of the present invention to provide a technique of allowing a user to easily make settings of processing conditions even for a set of many documents without having to know all details of documents before processing is started, and performing processing in accordance with the settings made by the user.

It is another object of the present invention to provide a technique of performing processing in a manner desired by a user without necessitating that the user make settings of all details of processing conditions before the processing is started.

It is another object of the present invention to provide a technique of applying a scan-all-first mode to a process including insertion of a sheet or insertion of a composite image, which needs information specifying a page position at which processing should be performed, to make it possible for a user to easily make necessary settings.

The invention provides a scan-all-first mode in which when a set of document sheets is given, all document sheets are read first. In reading of documents, the set of document sheets may be divided into subsets of document sheets, and reading may be performed on a subset-by-subset basis. After reading all documents, a job is performed to print all images of documents. In a case in which a given set of document sheets includes so many sheets that all sheets cannot be put on a document feeder at a time, or in a case in which a set of document sheets includes a special sheet such as a thick sheet that cannot be handled by the document feeder, the scan-all-first mode allows all images of the set of document sheets to be processed as a single copy job.

The invention provides a composite-with-form mode in which a form image is stored in advance, and a document image is combined with the form image and the resultant image is output.

Further objects, features and advantages of the present invention will become apparent from the following description of the preferred embodiments (with reference to the attached drawings).

BRIEF DESCRIPTION OF THE DRAWINGS

FIG. 6 is a diagram showing an example of a user interface screen according to an embodiment of the present invention.

FIG. 12 is a diagram showing an example of table data according to an embodiment of the present invention.

FIGS. 24A, 24B, and 24C are diagrams showing examples of user interface screens according to an embodiment of the present invention.

FIG. 25 is a diagram showing an example of a user interface screen according to an embodiment of the present invention.

FIGS. 26A, 26B, and 26C are diagrams showing examples of user interface screens according to an embodiment of the present invention.

DESCRIPTION OF THE PREFERRED EMBODIMENTS

Figure 1:
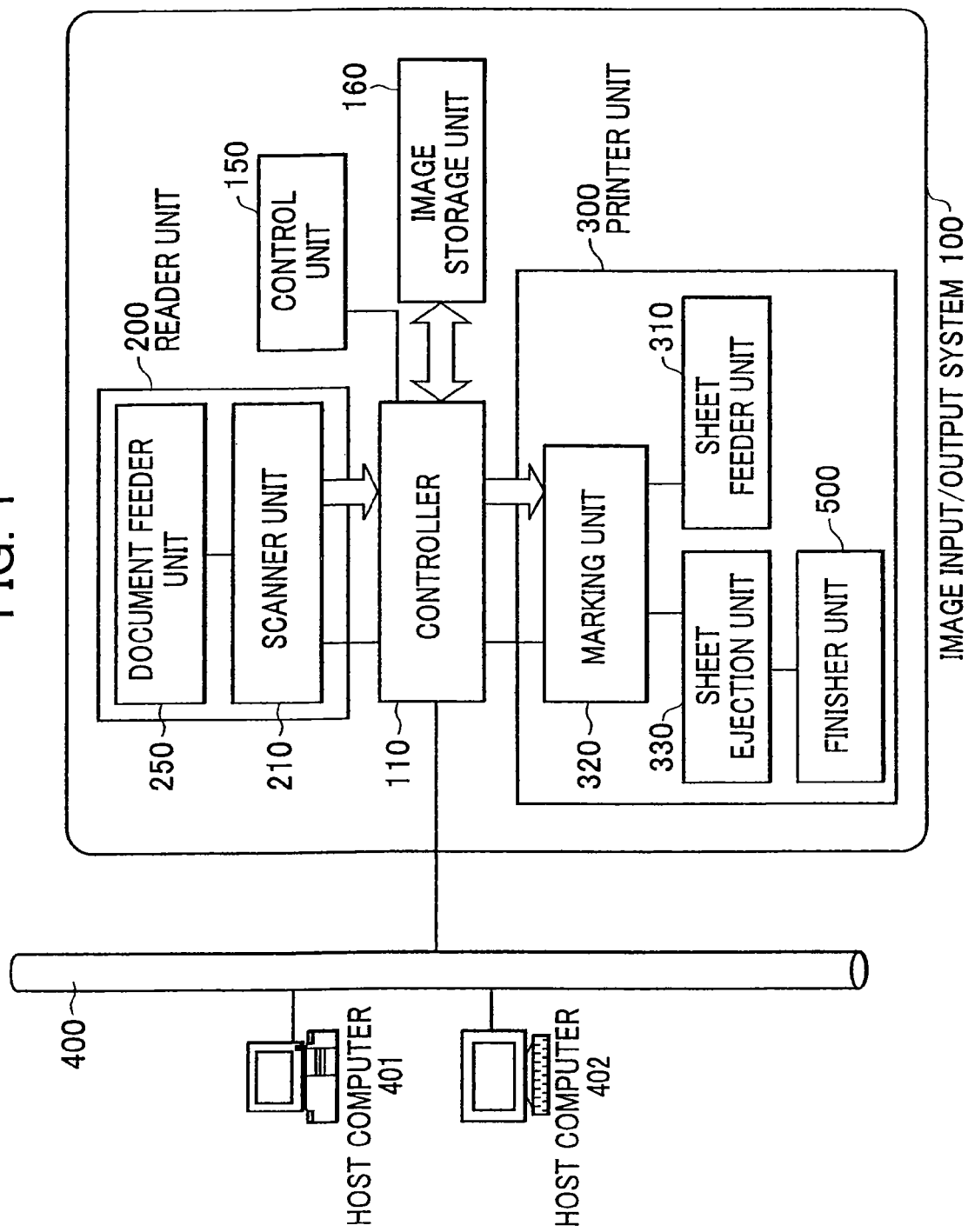
FIG. 1 is a block diagram showing a general construction of an image input/output system according to an embodiment of the present invention.

A general construction of an image input/output system according to an embodiment of the present invention is described below with reference to FIG. 1.

Reader unit 200 optically reads a document image and produces image data corresponding to the document image. The reader unit 200 includes a scanner unit 210 for scanning a document and a document feeder unit 250 for feeding documents.

Printer unit 300 feeds a print sheet, prints image data on the print sheet thereby forming a visual image thereon, and ejects the resultant print sheet from the printer unit 300. The printer unit 300 includes a sheet feeder unit 310 including a plurality of print sheet cassettes, a marking unit 320 for transferring image data to a print sheet and fixing the image, a sheet ejection unit 330 for ejecting the printed sheet out of the printer unit 300, and a finisher unit 500 for performing stapling and/or sorting.

A controller 110 is electrically connected to the reader unit 200 and the printer unit 300 and also to host computers 401 and 402 via a network 400.

The controller 110 controls the reader unit 200 and the printer unit 300 so that the reader unit 200 reads image data of a document. The printer unit 300 prints the image data on a print sheet, thereby providing a copying capability. The controller 110 is also capable of converting image data acquired via the reader unit 200 into code data and transmitting it the host computers via the network 400 thereby providing a scanner capability. Furthermore, the controller 110 is capable of converting code data received from a host computer via the network 400 into image data and outputting the image data to the printer unit 300, thereby providing a printer capability.

Images read by the reader unit 200 can be stored in an image storage unit 160. The printer unit 300 can read an image from the image storage unit 160 and can print it. This makes it possible to perform reading and printing independently. Furthermore, once image is stored in the image storage unit 160, it can be read and printed an arbitrary number of times. The image storage unit 160 includes a page memory capable of storing one page of data and also includes a hard disk or the like (not shown) capable of plural pages of data (image data, attribute data, etc.) A plurality of jobs (a plurality of image data sets) can be stored on the hard disk. An arbitrary job can be read from the hard disk when print is performed using the printer unit 300, or an arbitrary job can be read from the hard disk and transmitted to another apparatus. The image input/output system is capable of communicating with external apparatuses such as a host computer 401 and host computer 402 via a communication medium such as the network 400. Data input from an external computer can be stored in the page memory or the hard disk in the image storage unit 160. The image input/output system also has a facsimile capability, whereby print data can be received from an external facsimile machine and the received print data can be stored in the memory described above. The capability of storing data in the memory makes it possible to perform input processing and out processing independently. Input processing and output processing of a job can be in a synchronous or asynchronous manner as required. Furthermore, it is also possible to perform processing for a plurality of jobs concurrently (or in interleaved manner). For example, input processing for a certain job can be performed while performing output processing for another job.

The image input/output system 100 including an image forming apparatus such as a copying machine, a printer, a facsimile machine, or a multifunction machine according to the present embodiment can operate in various modes such as a copy mode in which an image read by the reader unit 200 is printed by the printer unit 300, a print mode in which data input from an external computer is printed by the printer unit 300, a facsimile mode in which data received from a facsimile machine at a remote location is printed by the printer unit 300, a transmission mode in which a job stored in the image storage unit 160 of the system 100 is transmitted to an external apparatus via a network or the like, and a box mode in which storage areas of the hard disk (not shown) of the image storage unit 160 are virtually assigned as boxes to respective users so that each user can use their own box in such a manner that user can store data in his/her box of the hard disk and can read it at a desired time to print it in a desired format or to transmit it to an external apparatus. Although in the present embodiment, the apparatus or the system has a plurality of functions, the present invention may also applied to an apparatus or a system having only one of the functions described above and may also be applied to an apparatus or a system having a greater number of functions. The techniques associated with processing, controlling, displaying, etc., disclosed herein may be applied to an apparatus or a system of any type and may be modified as required.

The control unit 150 is connected to the controller 110 and includes a liquid crystal touch panel having a display capability (of displaying processing conditions, control buttons, guidance information, an error message, status information, a preview image of an input image) and an input capability (of inputting various commands or data to set the processing mode, output conditions, and associated parameters) thereby providing a user interface which allows a user to control the image input/output system. The control unit 150 according to the present embodiment also includes, in addition to the touch panel described above, mechanical control means such as hard keys. Alternatively, the control unit 150 may include separate user interfaces such as a display for displaying data and an input device such as a ten-key pad for inputting data or commands or may include a single user interface on which all capabilities are integrated.

Figure 2:
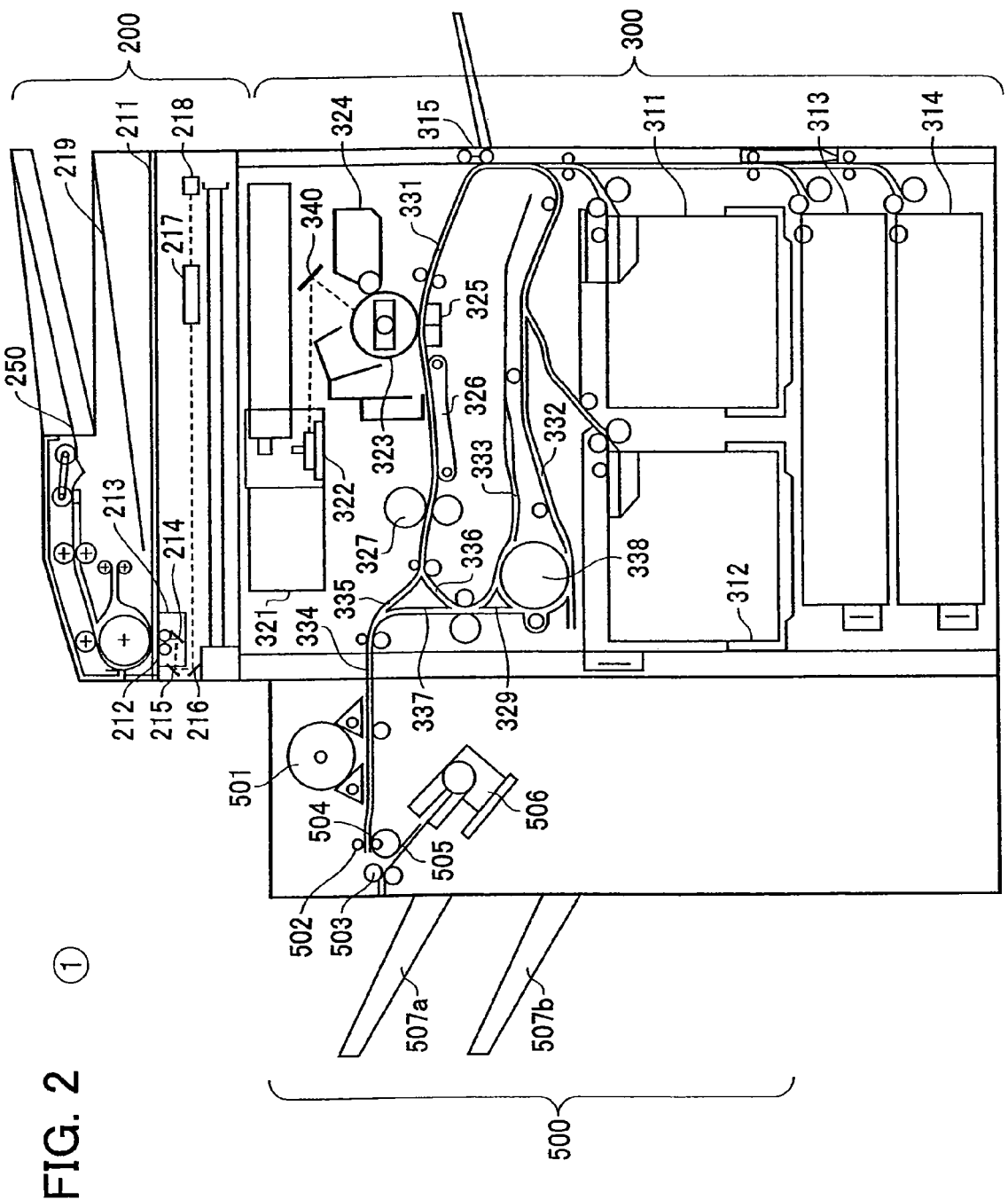
FIG. 2 is a cross-sectional view showing a reader unit and a printer unit.

FIG. 2 is a cross-sectional view showing the reader unit 200 and the printer unit 300 of the image input/output apparatus according to the present embodiment. In the reader unit 200, a document feeder unit 250 feeds documents to platen glass 211 on a sheet-by-sheet basis in the order from the top to the bottom of a pile of document sheets. After completion of reading the image of a document sheet, the document feeder unit 250 transfers the document sheet from the platen glass 211 to a scanned-document tray 219. When a document is fed onto the platen glass 211, a lamp 212 is lit and an optical unit 213 is moved so that the document is exposed to light emitted from the moving optical unit 213 thereby scanning the document. Reflected light from the document is incident on a CCD image sensor (hereinafter, referred to simply as a CCD) 218 via mirrors 214, 215, and 216 and via a lens 217. Thus, the scanned image of the document is read by the CCD 218. Image data is output from the CCD 218 and supplied to the controller 110 after being subjected to necessary processing. As required, the controller 110 stores the image data, as an output job, in the page memory or the hard disk of the image storage unit 160. Herein, each job corresponds to document data of a set of documents including one or more pages, and a plurality of jobs correspond to a plurality of document data sets. Each job is stored on the hard disk together with data or parameters indicating processing conditions, such as the output mode, the number of copies to be printed, the size of the print sheets to be used, the document size, the image intensity, and finishing processing conditions such as stapling conditions.

In the printer unit 300, a laser driver 321 drives the laser emitting unit 322 so as to emit laser light corresponding to the image data output from the controller 110 or the image data read from the page memory or the hard disk of the image storage unit 160. The laser light is irradiated to a photosensitive drum 323 so as to form a latent image thereon corresponding to the laser light. The latent image formed on the photosensitive drum 323 is then developed with developing toner supplied by a developing unit 324.

In synchronization with irradiation of the laser light, a print sheet is fed from one of a cassette 311, a cassette 312, a cassette 313, a cassette 314, and a manual sheet feed tray 315 to an image transfer unit 325 along a sheet transport path 331, and the toner image is transferred from the photosensitive drum 323 to the print sheet. The print sheet having the toner image formed thereon is transported to a fixing unit 327 by a transport belt 326. The fixing unit 327 fixes the toner image formed on the print sheet by means of heat and pressure. Thereafter, the print sheet is transported from the fixing unit 327 to the outside via a sheet transport path 335 and a sheet transport path 334. In a case in which the print sheet is ejected to the outside after being turned over, the print sheet is transported to a sheet transport path 336 and further to a sheet transport path 338, and then transported therefrom in a reverse direction to the outside via a sheet transport path 337 and the sheet transport path 334.

On the other hand, in a case in which printing on both sides of paper is specified in processing conditions set by a user, after the print sheet is transported from the fixing unit 327 to the sheet transport path 336, the print sheet is transported to a sheet transport path 333 via a flapper 329. Thereafter, the print sheet is transported in a reverse direction to a refeeding sheet path 332 via the flapper 329 and the sheet transport path 338. Thereafter, in synchronization with irradiation of the laser light, the print sheet is transported to the image transfer unit 325 from the refeeding sheet path 332 via the sheet transport path 331.

The print sheet ejected from the printer unit 300 via the sheet transport path 334 is transported to the finisher unit 500.

In the finisher unit 500, the print sheet is first transported to a buffer unit 501. In the buffer unit 501, as required, the print sheet is wound around a buffer roller for buffering. For example, in a case in which following processing such as stapling needs a long time, the buffer unit allows print sheets to be supplied at a properly adjusted speed. This allows an increase in throughput.

Thereafter, the print sheet is ejected onto a stack tray 507a via an upstream ejection roller pair 502 and a downstream ejection roller pair 503.

In the staple mode, immediately after the trailing end of the print sheet has passed through the upstream ejection roller pair 502, the print sheet is moved back by a knurl belt 504 and ejected onto a staple tray 505.

If a specified number of sheets have been put on the staple tray 505, sheets are stapled by a stapling unit 506 and ejected onto the ejection tray 507a by the downstream ejection roller pair 503. The stapling is performed or not performed in accordance with the settings made by the user.

The ejection tray has two bins 507a and 507b which can be synchronously moved up and down by a driving unit (not shown).

In the example shown in FIG. 2, the ejection trays 507a and 507b are at positions at which sheets are ejected onto the ejection tray 507a, the ejections trays 507a and 507b can be moved upward so that sheets are ejected onto the ejection tray 507b.

Figure 3:
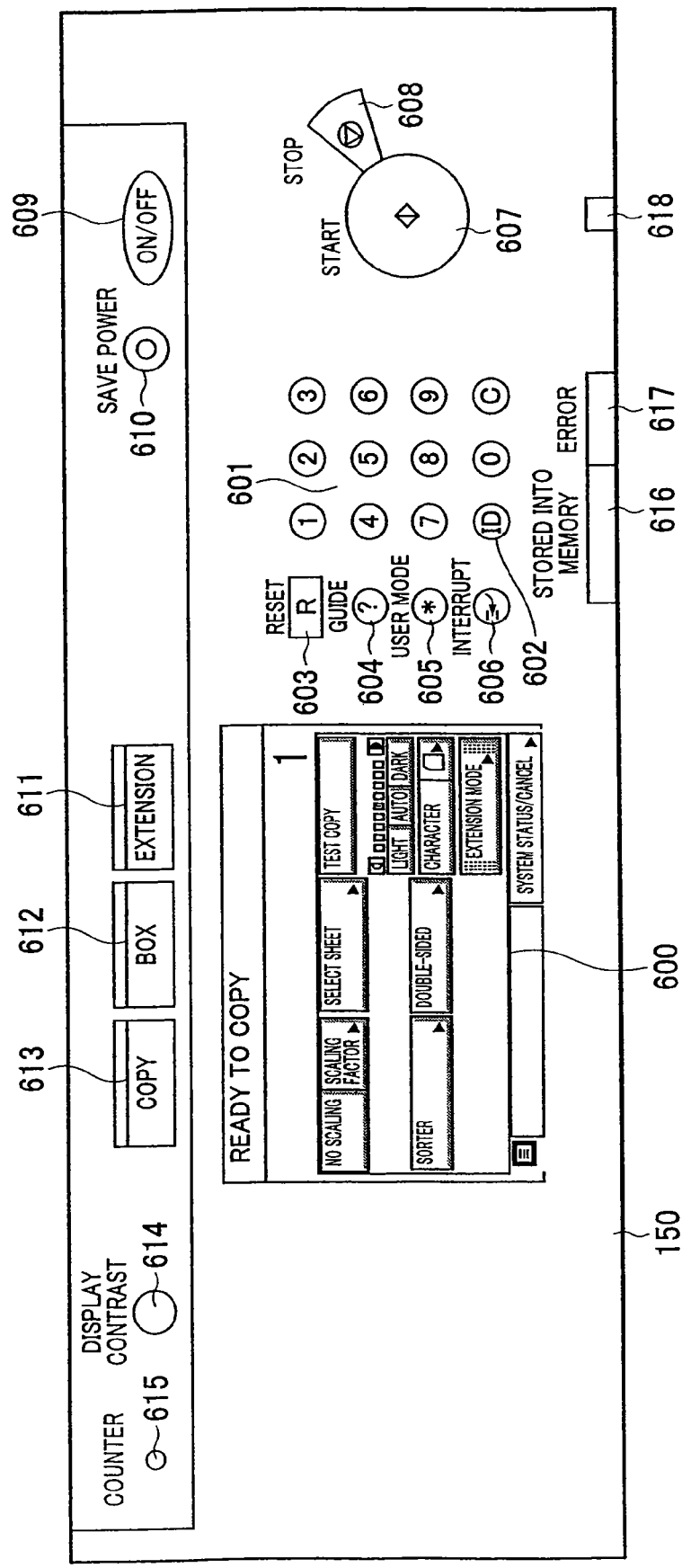
FIG. 3 is a schematic diagram showing a control unit.

Referring to FIG. 3, the control unit 150 is described below.

An LCD touch panel 600 is used to set main modes (and associated processing conditions). The LCD touch panel 600 also displays a status (and information indicating the current mode, processing conditions, and an error, and also guidance information). A ten-key pad 601 is used to input a numerical value from 0 to 9. An ID key 602 is used to input a section number and a password in a case in which the section number and the password are required to use the apparatus.

A reset key 603 is used to reset the mode being currently set. A guide key 604 is used to display guide information about the respective modes. (When this guide key 604 is pressed, guide information is displayed on the LCD 600). A user mode key 605 is used to open a user mode screen. An interrupt key 606 is used to interrupt the current operation to perform copying.

A start key 607 is used to start the copying operation. A top key 608 is used to stop the copy job being currently executed.

If a soft power switch 609 is pressed, the backlight of the LCD 600 is turned off, the operation mode of the apparatus falls into a low-power mode. If a save power key 610 is pressed, the apparatus enters into a power-save mode. If this key is pressed again, the apparatus returns to the normal mode from the power-save mode.

Functions keys 611, 612, and 613 are used to set the apparatus into an extension mode (including, for example, a transmission mode), a box mode, and a copy mode, respectively. In the example shown in FIG. 3, a user interface screen for use in the copy mode is displayed as a standard screen. If a function key 612 or 613 on this user interface screen is pressed, another user interface screen corresponding to the pressed function key is displayed.

A contrast key 614 is used to adjust the contrast of the LCD touch panel.

If a counter key 615 is pressed, a counter screen indicating the total number of copied sheets is displayed on the LCD.

An LED 616 is lit when image data is being stored in the image memory. An error LED 617 is lit to indicate that an error such as a paper jam or a door-open error has occurred in the apparatus. A power LED 618 is lit to indicate that the main switch of the apparatus is in an on-state.

The control unit 150, as with the other units such as the reader unit 200, the printer unit 300, and the image storage unit 160, is monitored and controlled by the controller 110. That is, the controller 110 controls all those units. More specifically, the controller 110 controls the control unit 150 so as to display various user interface screens. If setting information is input by a user via the user interface screen, the setting information is transferred from the control unit 150 to the controller 110. In accordance with the setting information, the controller 110 controls various units so as to provide a specified function or operation.

First Embodiment

The operation of main parts in the scan-all-first mode, performed under the control of the controller 110, according to a first embodiment of the present invention is described below with reference to flow charts and drawings shown in FIGS. 4 to 15. The displaying operation performed by the control unit 150 and operations performed by various units in accordance with commands input via the control unit 150 are also controlled by the controller 110.

Figure 14:
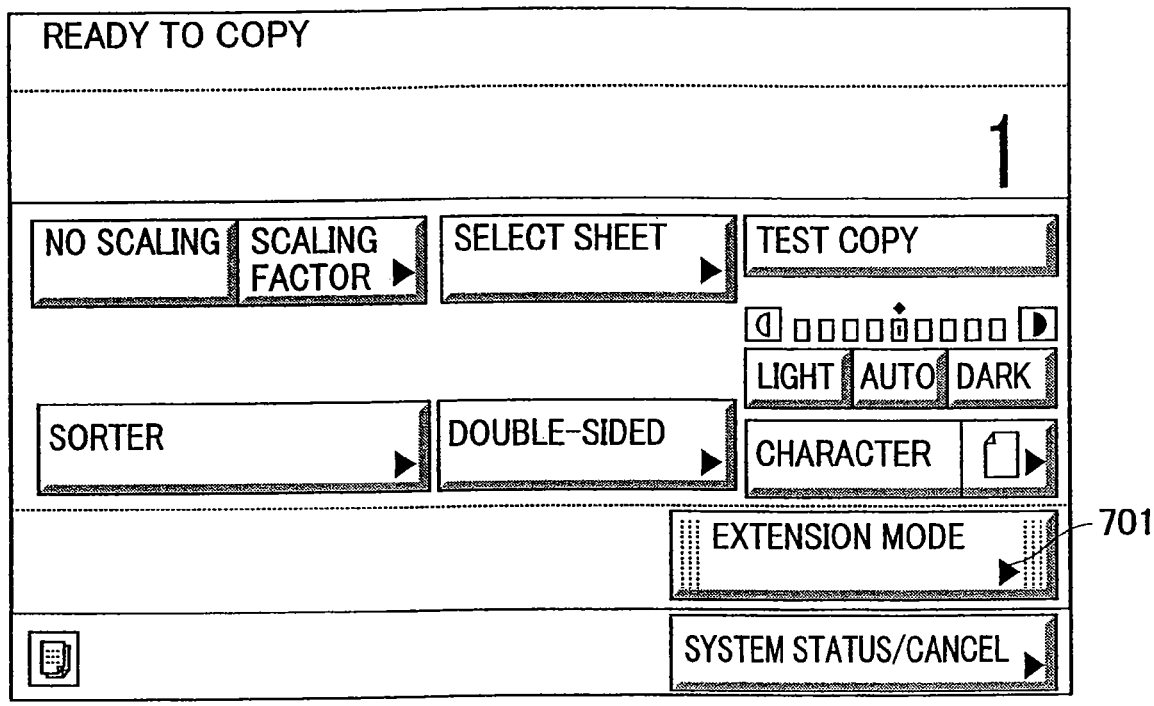
FIG. 14 is a diagram showing an example of a user interface screen according to an embodiment of the present invention.

FIG. 14 shows a standard screen displayed on the control unit 150. The present embodiment provides a plurality of modes (copy mode, box mode, transmission mode, etc.), and each mode has its own user interface screen. Users can select a basic screen of one of those modes as the standard screen (initial screen). The controller 110 displays the basic screen of a particular mode specified by a user as the standard screen on the display. In the following description, by way of example, it is assumed that the user interface screen in the copy mode has been selected as the standard screen. On the user interface screen, the user can make settings in terms of various items for example, selection of an operation mode and associated parameters. If the extension key 701 on the user interface screen shown in FIG. 14 is pressed by a user, the controller 110 controls the LCD 600 so as to display an extension mode setting screen, such as that shown in FIG. 15, on the control unit 150. If a scan-all-first key 702 on the extension mode setting screen is further pressed by the user, the controller 110 sets the operation mode to the scan-all-first mode.

The scan-all-first mode is described in further detail below. In the scan-all-first mode, a plurality of document data to be processed in a single job, such as a print job, a box registration job, or a transmission job, are separately input part by part via a plurality of input processes. After inputting is completed for all document data, all document data are combined together into a single group and processed in the single job.

The scan-all-first mode can be advantageously employed, for example, when all document sheets to be processed in a single job cannot be input in a single input process as is the case when the number of document sheets to be processed is greater than a maximum number of sheets which can be put at a time on the document tray of the auto document feeder (ADF) of the reader unit 200, or as is the case when a plurality of document sheets to be processed in a single job are input on a sheet-by-sheet basis by directly placing one sheet at a time on platen glass of a document plate. The scan-all-first mode can also advantageously be employed when it is desirable to deal with different jobs as a single job. That is, the scan-all-first mode allows plural sets of document data separately input via different input processes to be processed in a single job, to be dealt with as a single group of data.

For example, in a case in which a set of document sheets is input separately part by part via three input processes, a user first selects the scan-all-first mode. Once this mode is set, the controller 110 does not deal with subsets of document data input separately as different jobs and does not permit an output process to be performed until the inputting is completed for the full set of document data. More specifically, input document data is sequentially stored on the hard disk (not shown) of the image storage unit 160 while maintaining the correct page order (same as the order in which pages are input), until inputting is completed for the full set of document data. After completion of inputting of the full set of document data (via three input processes in this specific example), a subset of document data input via the first input process, a subset of document data input via the second input process, and a subset of document data input via the third input process are read from the hard disk page by page in a proper order (for example in the same order as that in which pages were input in a case in which pages were input in the order of increasing pages starting from the first page, or in the order opposite to the order in which pages were input in a case in which pages were input in the order of decreasing pages starting from the last page) and are combined together into a single job to further perform a following process such as a stapling process, a print process in a double-sided mode, a layout process, a storage process into a box allocated on the hard disk, or a transmission process to another apparatus.

In the above process, the determination of whether inputting of all document data to be processed in a single job is completed is made by the controller 110 by determining whether a scan end command has been issued by a user via the control unit 150. In a case in which the determination is made on the basis of the scan end command, if the controller 110 cannot detect a scan end command from a user after completion of inputting of one or more document sheets, the controller 110 determines that the input process is not completed yet and the controller 110 controls various related units, such as the reader unit 200, the image storage unit 160, the printer unit 300, and the control unit 150 so as to make it ready to scan another document. However, if the controller 110 receives a scan end command from the user after completion of inputting of one or more documents, the controller 110 determines that inputting is completed for all document data, and the controller 110 controls the relating units so that all input document data are combined into a single job and processed.

In the present embodiment, as described above, the user does not have to input a command to specify the number of times data will be input separately part by part in the scan-all-first mode, and the input process is continued until the scan end command is issued by the user, although the present invention may be applied to a case in which before starting the input process, the user inputs a value (three in the above example) indicating the number of times data is to be input separately, and the controller 110 starts an output process as a single job when the input process has been performed the specified number of times.

In the present embodiment, the image input/output system has other operation modes such as a printer mode and a facsimile mode in addition to the copy mode described above. In any of those operation modes, inputting of document data can be performed in the scan-all-first mode. For example, in a case in which data is input from an external computer, the controller 110 sets the input process mode to the scan-all-first mode in response to receiving via an external device interface a command to specify the scan-all-first mode from the external computer. After starting the input process in the scan-all-first mode, the controller 110 stores document data, which is input part by part from the external computer via the external device interface, on the hard disk so that the document data can be dealt with as a single job. When a command to end the inputting process in the scan-all-first mode is received from the computer via the external device interface, the controller 110 reads the full set of document data to be processed as the single job from the hard disk, and the controller 110 controls various units so as to perform a specified process, such as a print process, a box registration process, a transfer process to another apparatus as the single job.

Alternatively, if information indicating the number of times data is separately input part by part is received from the computer via the external device interface, inputting of data is performed via the external device interface until the inputting process has been performed the specified number of times, and the input data is stored on the hard disk while maintaining the correct page order so that the data can be used in the following output process to be performed as a single job, without allowing the data to be read from the hard disk until the completion of the inputting process for all data. When the inputting process has been performed the specified number of times and thus all data has been input, the controller 110 reads the full set of document data to be processed in the single job from the hard disk and performs the output process on the data read from the hard disk.

The scan-all-first mode according to the present embodiment, as described above, can be specified in various ways, such as issuing a scan end command, or by specifying the number of times the input process is performed, and can be used in various operation modes, such as an external mode like the copy mode, the facsimile mode, and the printer mode, the box mode, and the transmission mode. Because the scan-all-first mode can be used not only in the copy mode but also in other modes such as the facsimile mode or the printer mode, the scan-all-first mode in the input process is also called "input-all-first mode" depending on the operation mode.

If there are other modes, processing conditions, and/or parameters to be specified in the operation in addition to the input-all-first mode, the user can specify those via the control unit 150. After necessary processing conditions have been set by the user, if the start key 607 is pressed by the user, the controller 110 stores data indicating the processing conditions in the memory in relation to the job to be processed, and the controller 110 starts the copy sequence shown in the form of a flow chart in FIG. 4. In the copy sequence, the controller 110 controls various related units so that the copy sequence is correctly performed.

Figure 4:
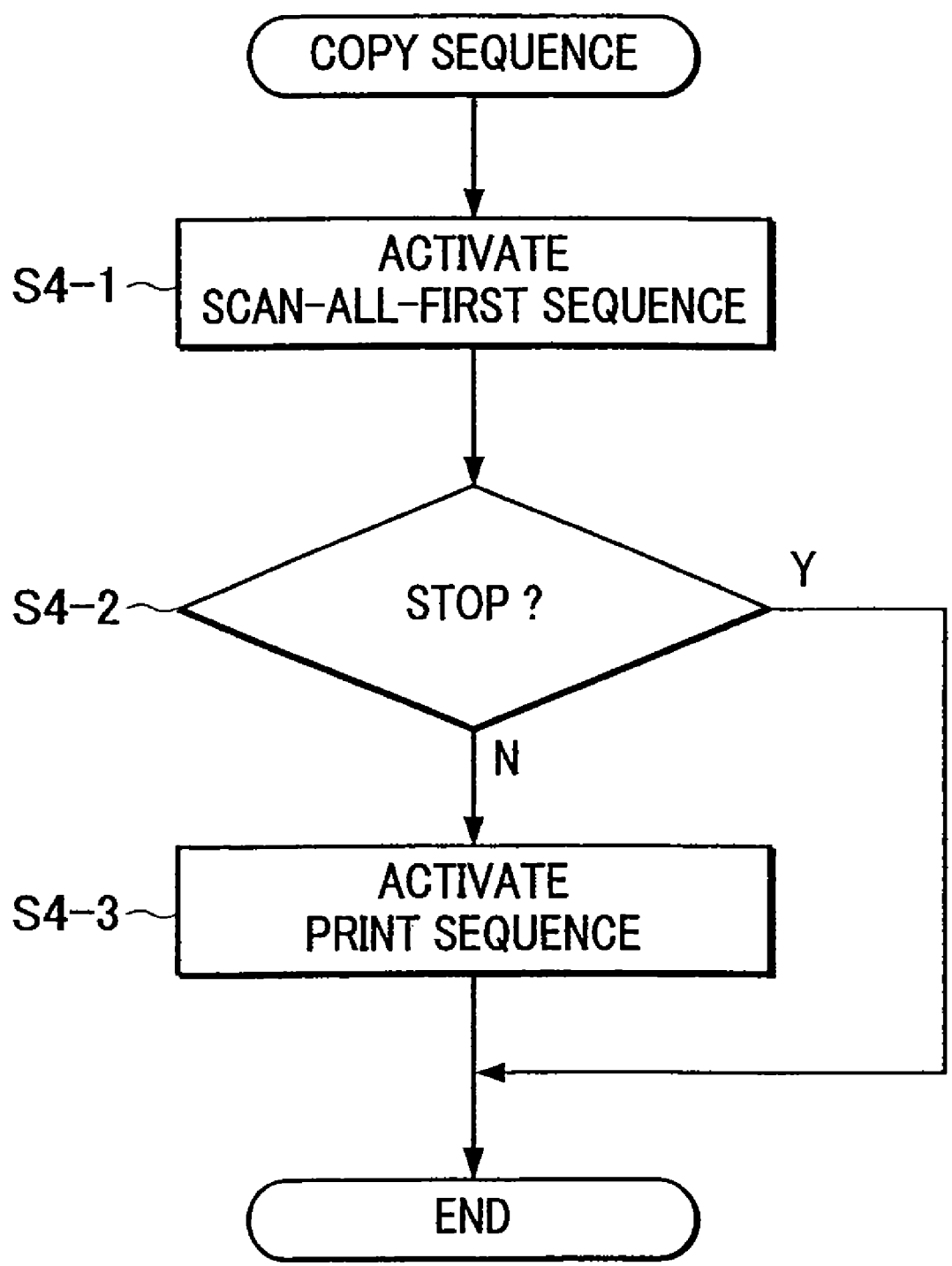
FIG. 4 is a flow chart showing a process according to an embodiment of the present invention.
Figure 5:
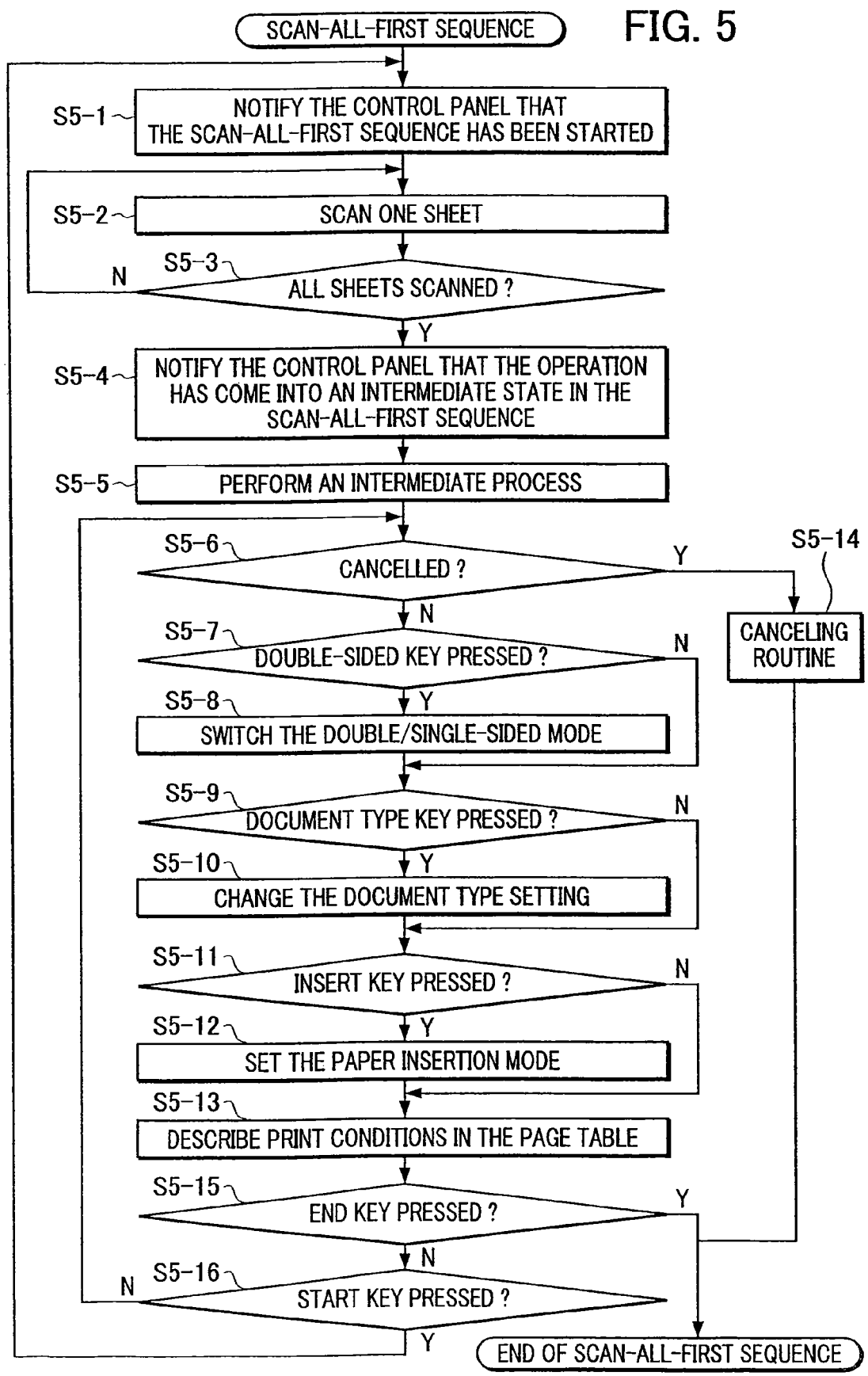
FIG. 5 is a flow chart showing a process according to an embodiment of the present invention.

The process shown in the flow charts shown in FIGS. 4 and 5 (and also other processes described elsewhere) is performed by the CPU of the controller 110 in accordance with a program stored in the memory of the controller 110.

Figure 15:
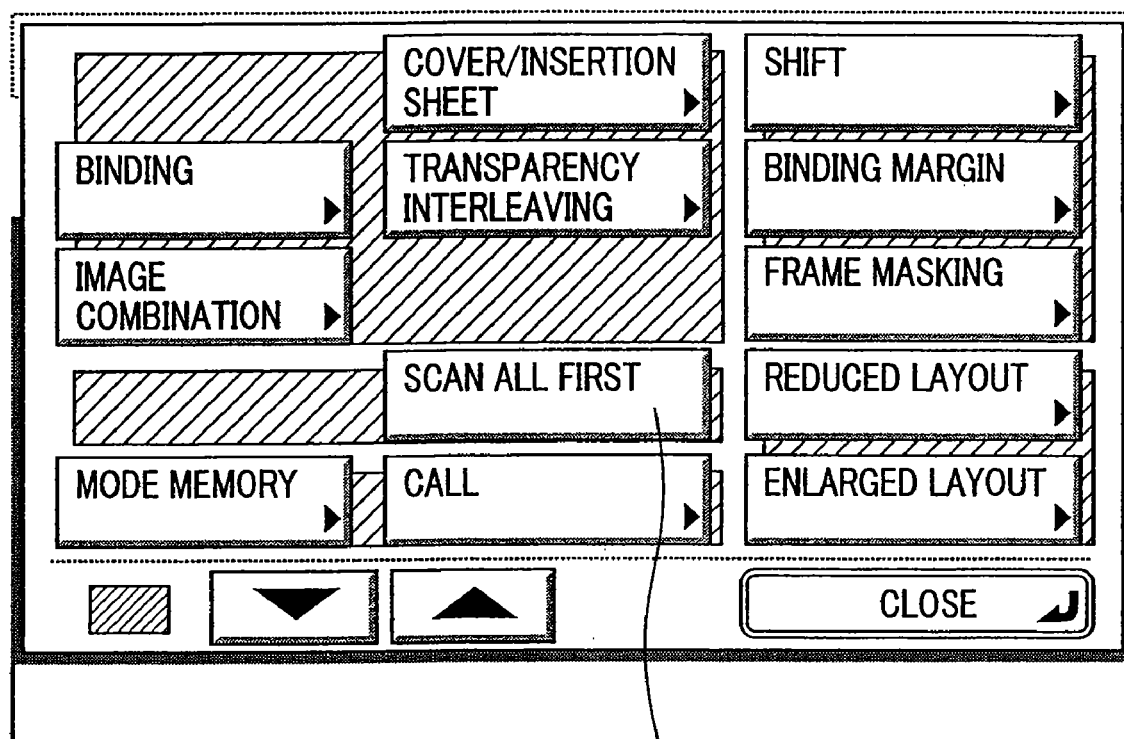
FIG. 15 is a diagram showing an example of a user interface screen according to an embodiment of the present invention.

First, in step S4-1, if a scan-all-first start command is issued by a user by pressing a SCAN ALL FIRST key 702 on the extension mode setting screen shown in FIG. 15, a scan-all-first sequence is started. The scan-all-first sequence is described below with reference to a flow chart shown in FIG. 5.

In step S5-1, a control-unit control task is informed that the process has entered into the scan-all-first mode, and information indicating that scanning process is being performed is displayed on the screen of the control unit 150, as shown in FIG. 6. This screen includes a status display area in which information indicating status in terms of various processing conditions in the input process, such as the remaining memory capacity, the printing status, or the processing time, is displayed. The screen also includes a display area in which processing conditions, such as the scaling factor, the sheet size, or the scanning intensity level, are displayed. Furthermore, the screen includes a command area for inputting a command such as a cancel command. In step S5-2, a one-sheet scan process (including scanning a document sheet and storing the obtained document data on the hard disk of the image storage unit 160) is performed. In this case, a document sheet is put directly on the platen, in the mode in which document sheets are placed one by one directly on the platen glass and scanned, without using the ADF, and only scanning is performed. However, in a case in which two or more document sheets are put on the ADF, in the mode in which scanning is performed using the ADF, one document sheet is fed from the document tray of the ADF to the scanning position, scanned at the scanning position, and transported to the ejected document tray. The process in step S5-2 is repeated until all documents sheets have been scanned.

In the put-on-platen mode, a document sheet is directly put on the document scan plate by a user and thus only one document sheet is dealt with in this step. In this mode, the scanner unit is moved while maintaining the document sheet at a fixed position. On the other hand, in the ADF mode, document sheets put on the document tray of the ADF are fed sheet by sheet to the scanning position and scanned. In this mode, the scanner unit is fixed and the documents are passed over the scanner unit sheet by sheet so that the document images are read when the document sheets pass over the scanner unit. This mode is also called a document flow mode. Thus, in the ADF mode, as many document sheets as document sheets put by a user on the document tray are scanned in this step until all document sheets have been fed and scanned.

In the scan-all-first mode, as described above, the maximum number of document sheets pages which can be scanned in a single process in step S5-2 is equal to one in the case of the put-on-platen mode, and equal to the number of document sheets set on the document tray of the ADF, within the range from one to the maximum number of document sheets allowed to be placed on the document tray, in the case of the ADF mode. The ADF has a transport path for double-sided scanning, and thus in the ADF mode, both sides (two pages) of each document sheet can be scanned. In the case in which both sides are scanned using the ADF, the maximum pages which can be scanned in a signal process in step S5-2 is equal to twice the maximum number of document sheets allowed to be put on the document tray.

The document data obtained via steps S5-2 and S5-3 is stored on the hard disk of the image storage unit 160 while maintaining the correct page order. When the document data is stored on the hard disk, associated information such as page information, image addresses, etc., needed to manage the document data is described in a management table and stored on the hard disk so that the document data can be correctly read, as required, from the hard disk in a process which will be performed later.

Figure 7:
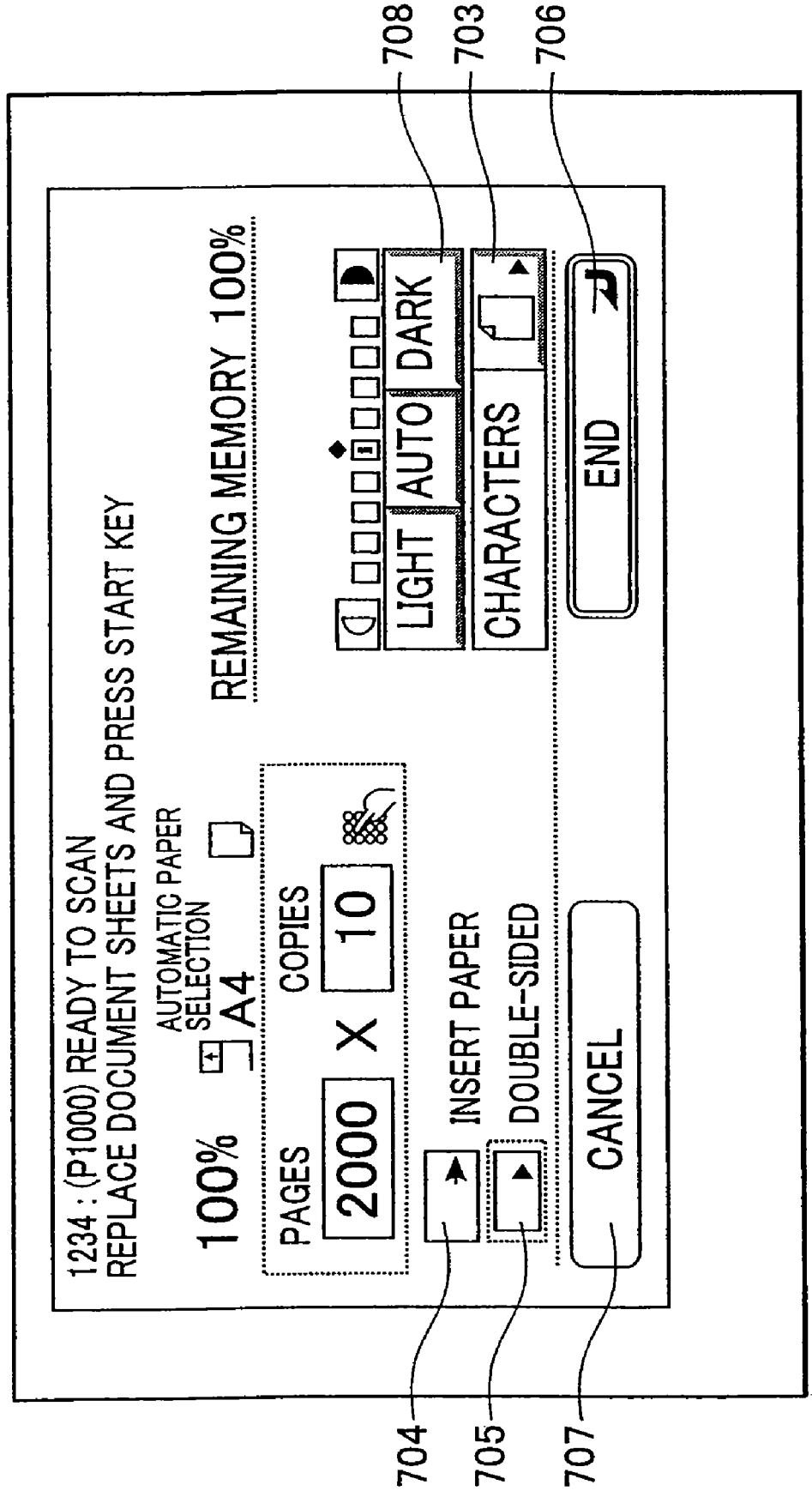
FIG. 7 is a diagram showing an example of a user interface screen according to an embodiment of the present invention.

In step S5-3, it is determined whether scanning is completed for all document sheets which should be scanned at a time. When scanning documents using the platen, the answer to decision step S5-3 becomes "Yes" when one document sheet has been scanned. On the other hand, in the case in which a plurality of document sheets are put on the document tray of the ADF, the answer to decision step S5-3 becomes "Yes" when scanning is completed for all document sheets put on the document tray. When scanning using the ADF, the presence or absence of document sheets on the document tray of the ADF is detected by a document sensor disposed on the document tray. If the controller 110 receives information indicating that there are no more documents on the document tray from the reader unit 200, the controller 110 determines as yes in step S5-3. If the answer to decision step S5-3 is "No", the process returns to step S5-2 to read a document image data of a next page. On the other hand, if the answer to decision step S5-3 is "Yes", the process proceeds to step S5-4. In step S5-4, the controller 110 notifies the control-unit control task that the process has entered into an intermediate state in the scan-all-first mode. In response to receiving the notification, the control unit 150 displays a screen as shown in FIG. 7. The intermediate state in the scan-all-first mode refers to a state in which the input process in the scan-all-first mode, in steps S5-2 and S5-3, for one of subsets of document data is completed but the input process for a next subset of document data is not started yet and the reader unit 200 is not currently performing the input process. In this intermediate state, a user may put a next subset of document sheets to be scanned on the document tray and may set necessary conditions via the control unit. In the intermediate state, the controller 110 controls the control unit 150 to display a user interface screen such as that shown in FIG. 7 for use in the intermediate state in the scan-all-first mode. Using the user interface screen shown in FIG. 7 displayed in the intermediate state, it is possible to change some conditions, as required, for the next subset of document sheets to be scanned. The user interface screen shown in FIG. 7 includes command keys 703 to 708 used by a user to input a command to specify scanning conditions, and a scanning condition display area in which information indicating the current scanning conditions is displayed. In the specific example shown in FIG. 7, the scaling factor is set to 100%, the print sheet size is set to A4 in vertical position, the intensity level is adjusted automatically, and the document type is set to text. The user interface also includes a status display area in which the operation status of the apparatus is displayed. In the specific example shown in FIG. 7, information displayed in this area indicates that the remaining available storage capacity of the hard disk is 100% and scanning can be started. Additionally, the user interface includes an operation guidance display area in which guidance information in terms of the operation to be performed by a user is displayed. In the specific example shown in FIG. 7, the guidance information displayed in this area indicates that the user should replace the document sheets and press the start key. The controller 110 displays the user interface screen, such as that described above, on the LCD of the control panel 150. The details of this user interface screen are determined on the basis of information associated with setting made by a user, data associated with display elements and information indicating the operation status given by status sensors of respective units. The display elements described above may all be displayed on a single screen as in the present embodiment, or some display elements may be displayed on a different screen. Alternatively, respectively display elements may be displayed on different screens. In this user interface screen, a document type key 703 is used to specify the document type such as text, mixture of text and picture, or picture. Image processing parameters associated with the image quality or the like are determined in accordance with the document type specified using the document type key 703, and image processing is performed in accordance with the determined parameters. An insert-sheet key 704 is used to specify the sheet insertion mode. A double-sided key 705 is used to specify either the double-sided scanning mode, in which both sides of each document is scanned and image data thereof is stored in the memory, or a single-sided scanning mode, in which only one side of each document is scanned and image data thereof is stored in the memory. Each time this double-sided key 705 is pressed, the mode is switched between the double-sided scanning mode and the single-sided scanning mode. If an end key 706 is pressed, the scanning of documents in the scan-all-first mode is ended and outputting in a specified mode (print mode, for example) is started for the full set of document data (one job data) scanned and stored on the hard disk of the image storage unit 160 in this scan-all-first mode. Thus, this end key 706 functions not only to end the scan-all-first process and also to start a following outputting process. A cancel key 707 is used to cancel the copy job. If this cancel key 707 is pressed, everything in this scan-all-first mode is cancelled and the document data acquired in the present process in the scan-all-first mode is discarded. Intensity level keys 708 are used to adjust the intensity level. In addition to the keys 703 to 708 described above, the user interface screen also includes a display area for specifying other processing conditions such as the number of sheets to be output, the number of copies to be output, etc. Setting of the number of sheets or copies to be output may be performed using soft keys displayed on the display panel or hard keys such as a ten-key pad. In the present embodiment, keys for setting processing conditions, such as keys 703 to 708, included in the user interface screen displayed in the intermediate state in the scan-all-first mode can be classified into two types: setting change keys for changing the processing conditions which have already been set (in the specific example shown in FIG. 7, keys 703, 705, and 708, and keys for changing the number of sheets or copies to be output (not shown)); and keys for setting processing condition which have not set yet (for example, the key 704 in the specific example shown in FIG. 7). In the latter type, keys may have both capabilities of changing conditions and setting new conditions. In the present embodiment, the user interface screen may have only one type of keys or may have both types of keys. Furthermore, one type of keys may all be displayed on a sub-screen, or some keys including both types may be displayed on a sub-screen. In any case, respective display areas are displayed on the user interface screen in such a manner that users can understand the purposes of those display areas. By displaying the above-described user interface screen in an intermediate state in the scan-all-first mode in a period after the process of inputting a set of data in the scan-all-first mode is started by the reader unit 200 and before the output process as a single job of the data input in the scan-all-first mode is started, it becomes possible for the apparatus to deal with the job in the scan-all-first mode in various manners as specified by users. This eliminates the troublesome and complicated user operations which are needed in the conventional technique. That is, it becomes possible to output a job in a desired form under desired conditions without necessitating that the user knows all details of documents to be processed and that the user sets all conditions associated with the process to be performed before starting the process. The above-described advantages become much greater, in particular, when the job includes a large number of document sheets. The great advantages obtained in such a situation will become apparent upon considering disadvantages in a mode in which the user has to know all details of conditions and status associated with a great number of document sheets to be processed. Also in the sheet insertion mode, the user does not have to know at which page to insert an insertion sheet before starting the process, but the user can make settings as required in the middle of the process. When there are a large number of document sheets to be processed, the process can be performed in an easy fashion without necessitating that the user performs complicated or troublesome operations. Thus, even in the case in which the process should be performed correctly as in the sheet insertion mode in which additional sheets should be inserted at correct pages, the process can be performed correctly even for a job including a large number of document sheets without necessitating that the user performs complicated and troublesome operations. Furthermore, after starting the process of inputting data, if the user notices that some necessary condition has not specified yet or some condition should be corrected, the user can specify or correct the condition in the intermediate state without causing some data to be output in an undesired manner which can occur in the conventional technique.

In step S5-5, the user inputs necessary commands via a user interface screen displayed in the intermediate state in the scan-all-first mode, such as that shown in FIG. 7.

In step S5-6, it is determined whether the cancel key 707 on the screen shown in FIG. 7 is pressed by the user. If yes, the process jumps to step S5-14. In step S5-14, the copying operation is cancelled and the subroutine is ended. More specifically, data, which has been input and stored on the hard disk in step S5-2 during the process for the cancelled job and other data, such as data indicating processing conditions or parameters associated with the job, is deleted.

In a case in which the answer to decision step S5-6 is no, the process proceeds to step S5-7. In step S5-7, it is determined whether the double-sided key 705 on the screen shown in FIG. 7 is pressed by the user. If no, the process jumps to step S5-9. However, if yes, the process proceeds to step S5-8. In step S5-8, the mode is switched between the double-sided mode and the single-sided mode, and the process proceeds to step S5-9. Note that in step S5-8, in a case in which the key 705 is pressed by the user when the mode is in the double-sided mode, the mode is switched from the double-sided mode to the single-sided mode, while in a case in which the key 705 is pressed when the mode is in the single-sided mode, the mode is switched from the single-sided mode to the double-sided mode. The information indicating the conditions set above is stored in relation with the job in the memory. The controller 110 operates so that the conditions set herein are reflected for a next subset of document data which is a part of the full set of document data to be dealt with as the same group of data and which is going to be input in step S5-2 following the subset of document data which has already been input and stored on the hard disk.

In step S5-9, it is determined whether the document type setting key 703 on the screen shown in FIG. 7 is pressed by the user to change the setting of the document type. If no, the process jumps to step S5-11. However, if yes, the process proceeds to step S5-10, and the document type is reset as specified by the user. Thereafter, the process proceeds to step S5-11. The parameter indicating the document type set in step S5-10 is also stored, as one of conditions associated with the present job, in the memory in relation to the job. Also in this case, the controller 110 operates so that the conditions set herein are reflected for a next subset of document data which is a part of the full set of document data to be dealt with as the same group of data and which is going to be input in step S5-2 following the subset of document data which has already been input and stored on the hard disk.

In step S5-11, it is determined whether the insert-sheet key 704 on the screen shown in FIG. 7 is pressed by the user. If no, the process jumps to step S5-13. However, if yes, the process proceeds to step S5-12. In step S5-12, the sheet insertion mode is set and a user interface screen is presented so that in the intermediate state in the scan-all-first mode, the user is allowed to make settings associated with processing conditions in the sheet insertion mode, as will be described in detail below.

Figure 8:
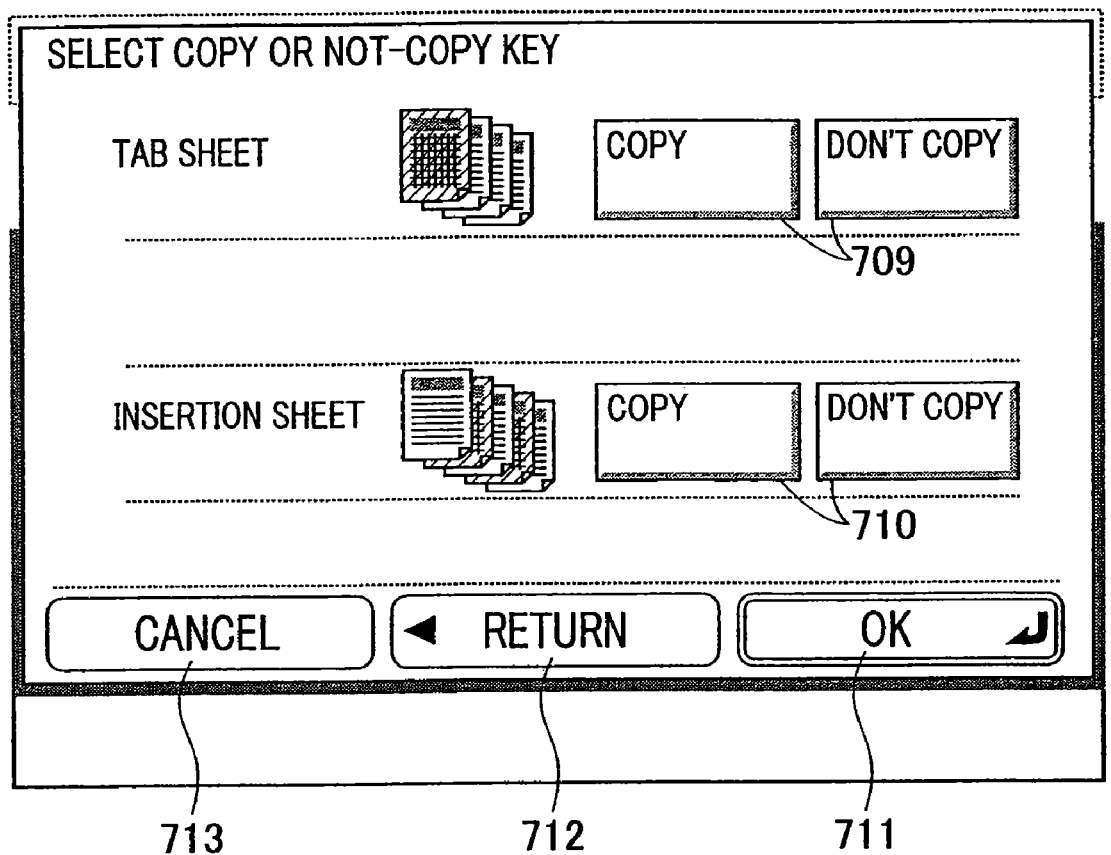
FIG. 8 is a diagram showing an example of a user interface screen according to an embodiment of the present invention.

FIG. 8 shows a screen which is displayed when the insert-sheet key 704 on the screen, shown in FIG. 7, displayed on the control panel of the control unit 150 is pressed by the user. The switching of the displayed screen is performed by the controller 110 by controlling the control unit 150 in response to pressing of the key 704. On the screen shown in FIG. 8, the user can specify processing conditions or parameters in terms of an insertion sheet or a tab sheet to be inserted in the sheet insertion mode. Herein, the insertion sheet refers to a sheet with a normal size and a normal shape, and the tab sheet refers to a sheet having a tab added with a normal sheet, such as that shown in FIG. 21. The type of a sheet (paper quality such as a normal sheet, recycled paper, or colored paper and sheet size) to be used as the insertion sheet and the type of a sheet to be used as a tab sheet can be specified by a user via a user interface screen (not shown). The user interface screen shown in FIG. 8 includes display elements such as a selection area which allows a user to select, from a plurality of candidates, a type of a sheet to be inserted, for a job to be processed in the scan-all-first mode (either a tab sheet or an insertion sheet can be selected, in the specific example shown in FIG. 8), and a selection area which allows the user to select whether data of the input job should be printed on a sheet of the selected type (by pressing a "Copy key" or a "Don't Copy" key, in the example shown in FIG. 8). The display elements are produced on the basis of the data stored in the display screen memory (not shown).

Keys 709 are used to select a tab sheet as the type of sheet to be inserted and to specify whether or not printing on the tab sheet is performed. Keys 710 are used to select an insertion sheet as the type of sheet to be inserted and to specify whether or not printing on the insertion sheet is performed.

Of the four keys displayed on this screen, only one key can be selected. When one of the four key is selected, if another key is selected, the selection of the former key is cancelled and the selection of the latter key becomes valid. If an OK key 711 is pressed, the data input by the user via the user interface screen shown in FIG. 8 is applied to the settings, and the displayed screen is switched to a next user interface screen is opened. A key 712 is used to go back to an immediately previous user interface screen, shown in FIG. 7. A key 713 is used to cancel the settings. The keys 711, 172, and 713 used for the same purposes as described herein will frequently appear in the following description, although the functions thereof will not be described again.

Figure 9:
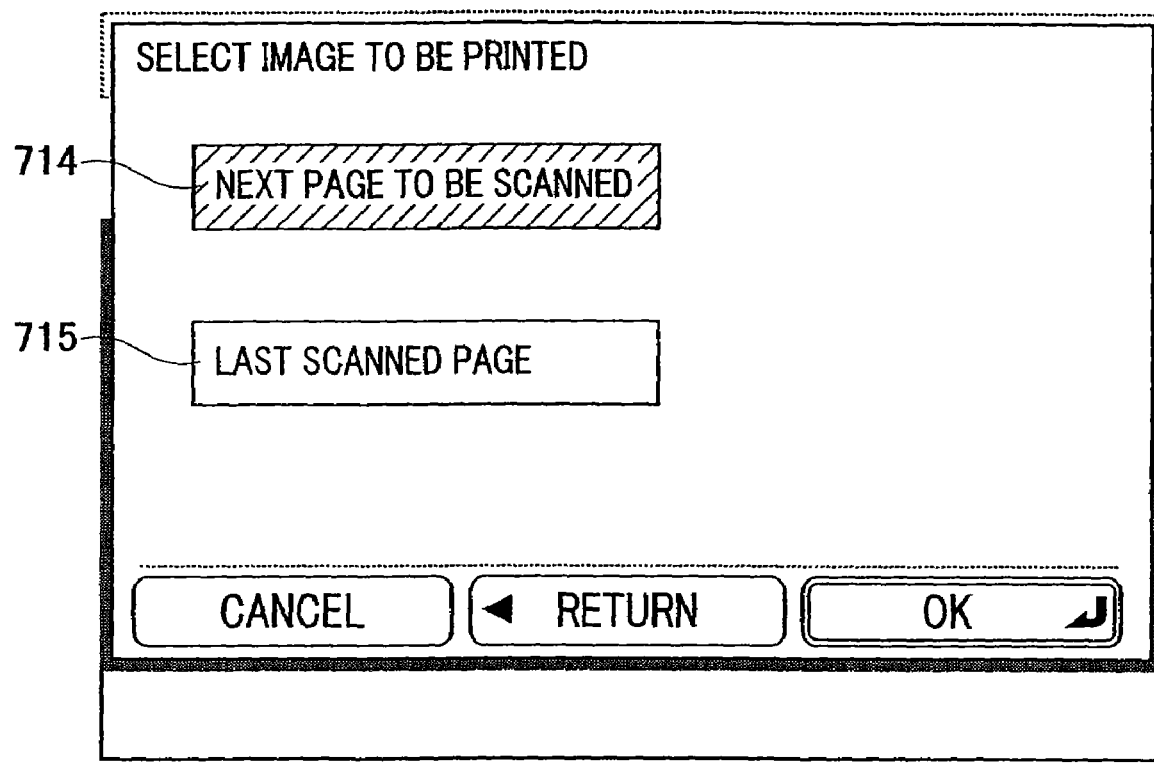
FIG. 9 is a diagram showing an example of a user interface screen according to an embodiment of the present invention.

If "copy" is selected by pressing the key 709 or 710 on the user interface screen shown in FIG. 8 and then the OK button is pressed, the controller 110 controls the control unit 150 to display a screen such as that shown in FIG. 9. On the user interface screen shown in FIG. 9, the user can specify which page to print on an insertion sheet or a tab sheet selected by the user via the user interface screen shown in FIG. 8. In the specific example shown in FIG. 8, candidates for pages to be printed on the inserted sheet are displayed so that the user can select a page from the candidates. Also in the case of the user interface screen shown in FIG. 9, data representing the display elements is stored in the display screen memory. Under the control of the controller 110, the control unit 150 reads the display element data from the memory and displays the elements on the screen. For example, if a key 714 on the user interface screen shown in FIG. 9 is selected by the user, the controller 110 stores information, as control information, indicating that the next page has been selected. The controller 110 then controls the related units, such as the reader unit 200, the image storage unit 160, and the printer unit 300, in the following process so that an image which will be scanned next, or the image of a document sheet which is scanned first in the next input process in step S5-2 in the scan-all-first mode and stored on the hard disk, will be printed on the inserted sheet. On the other hand, in the case in which a key 715 on the user interface screen shown in FIG. 9 is selected by the user, the controller 110 stores information indicating that the last page has been selected, and the controller 110 controls the related units, such as the reader unit 200, the image storage unit 160, and the printer unit 300 in the following process so that an image, which was scanned and stored on the hard disk (in step S5-2) immediately before the process entered into the intermediate state (step S5-5) in the scan-all-first mode, will be printed on the inserted sheet. If the OK key on the user interface screen shown in FIG. 9 is pressed, the controller 110 controls the control unit 150 so as to switch the displayed screen from the user interface screen shown in FIG. 9 to a user interface screen such as that shown in FIG. 10. On the other hand, in the case in which "Don't Copy" is selected by pressing either of keys 709 or 710 on the user interface screen shown in FIG. 8 and the "OK" key 711 on the user interface screen shown in FIG. 8 is then pressed, the controller 110 skips the process of displaying the user interface screen shown in FIG. 9 and controls the control unit 150 so as to switch the displayed screen from the user interface screen shown in FIG. 8 to the user interface screen shown in FIG. 10.

Figure 10:
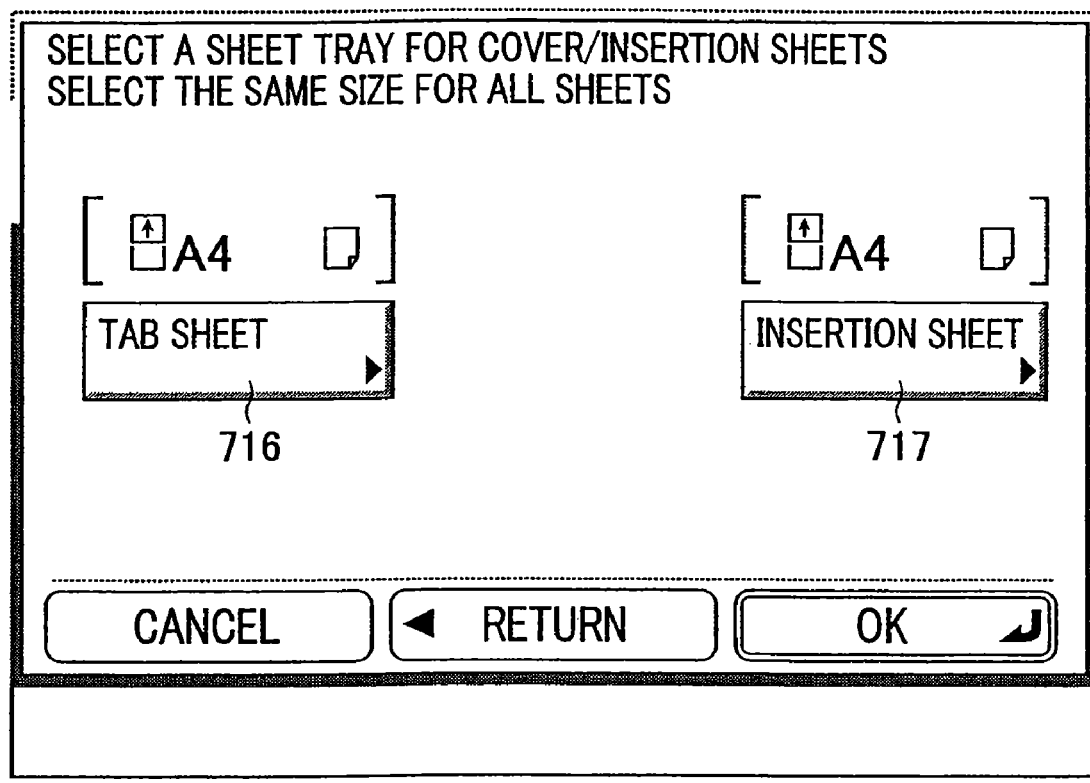
FIG. 10 is a diagram showing an example of a user interface screen according to an embodiment of the present invention.

On the user interface screen shown in FIG. 10, the user can specify which of sheet feeder units of the apparatus the tab sheet or the insertion sheet is to be fed. In a case in which a key 716 is selected, the controller 110 selects a tab sheet feeder, while the controller 110 selects an insertion sheet feeder if a key 717 is selected.

In the example shown in FIG. 10, both the key 716 and the 717 are displayed in a similar manner on the user interface. In practice, the controller 110 controls the operation so that either the tab sheet key 716 or the insertion sheet key 717 is highlighted depending on which key has been selected by the user on the user interface screen shown in FIG. 8, and so that the user can select only one type of sheet feeder. If the key 716 or 717 on the user interface screen shown in FIG. 10 is pressed, the controller 110 controls the control unit 150 so as to switch the displayed screen from the user interface screen shown in FIG. 10 to a user interface screen shown in FIG. 11. On the user interface screen shown in FIG. 11, the user can select a desired sheet feeder unit. If a sheet feeder unit is selected by the user via the user interface screen shown in FIG. 11 and a close key 718 is pressed, the controller 110 finishes the setting process associated with the sheet insertion and stores, in the memory, control information indicating the specified processing conditions associated with the sheet insertion specified via the user interface screens shown in FIGS. 7 to 11. The controller 110 produces a page table, which will be described later, on the basis of the processing conditions specified above by the user so that relating units will be controlled so as to perform operations in accordance with the specified processing conditions.

In step S5-13, the page table is stored. A specific example of the page table is described below with reference to FIG. 12. The page table may be created on the hard disk of the image storage unit 160 or on other memory. In the example of the page table shown in FIG. 12, document pages stored on the hard disk are described in a column 719, in which M pages of input data are described. In a column 720, pages on which input data should be printed are described, a total of N pages. In column 721, sheet feeder units to be used to print the data on the specified pages are described. In column 722, print modes to be employed in printing on either of the specified pages are described. For example, the data in row 723 indicates that the input image of the first document page should be printed on the first output page in the normal print mode using the normal sheet feeder.

The data in row 724 indicates that the third page of the input document data should be printed on the third output page using an insertion sheet fed from the insertion sheet feeder in the print mode in which the image is printed on the insertion sheet. The page table having such a content is produced, for example, in a case in which an intermediate state in the scan-all-first mode appears between the second and third input document pages, for example, in a period from a time at which an input process for a subset of document data including the second document page is completed to a time at which an input process for a subset of document data including the third document page is started. In this intermediate state, the user sets processing conditions associated with the sheet insertion mode via user interface screens such as those shown in FIGS. 7 to 11 displayed, by the controller 110, on the control unit 150 in such a manner that "sheet insertion" is selected on the user interface screen shown in FIG. 7, "Copy" is selected on the user interface screen shown in FIG. 8, and "Next Page" is selected as a page to be printed via the user interface screen shown in FIG. 9.

The same page table is produced also in a case in which an intermediate state in the scan-all-first mode appears between the third and fourth input document pages. For example, in a period from a time at which an input process for a subset of document data including the third document page is completed to a time at which an input process for a subset of document data including the fourth document page is started. In this intermediate state, the user sets processing conditions associated with the sheet insertion mode via user interface screens such as those shown in FIGS. 7 to 11 displayed, by the controller 110, on the control unit 150 in such a manner that "sheet insertion" is selected on the user interface screen shown in FIG. 7, "Copy" is selected on the user interface screen shown in FIG. 8, and "Previous Page" (which was input at the end of the immediately previous input process) is selected as a page to be printed via the user interface screen shown in FIG. 9.

The data in row 725 in the table indicates that for the sixth output page, a sheet should be fed from the insertion sheet feeder and no data should be printed thereon. This can occur when "Don't Copy" on insertion sheet is selected on the user interface screen shown in FIG. 8. In this case, no data is described in the document page column, because printing is not performed. That is, the output process of this page is performed such that an insertion sheet is simply fed from the specified insertion sheet feeder to the ejection tray without performing printing. The setting of row 725 in the page table is performed in the above-described manner, for example, in a case in which in an intermediate state between the fifth and sixth document pages, "Insert Sheet" is selected on the user interface screen shown in FIG. 7, "Don't Copy" is selected on the user interface screen shown in FIG. 8, and "Insert Before the Next Page" is selected on a user interface screen (not shown) similar to that shown in FIG. 9.

The data in row 726 in the table indicates that the sixth page of the input document data should be printed on the seventh output page (seventh output), a sheet for the seventh output page should be fed from a normal sheet feeder, and the printing on the seventh output page should be performed in the normal print mode.

The description of the page table in steps S5-13 is performed on a page-by-page basis in terms of output pages. The number of output pages to be described in the page table at a time in step S5-13 varies depending on the number of document pages input in an input process in step S5-2 performed immediately prior to step S5-13 and also depending on the processing conditions, including the processing conditions associated with the insertion sheet, set by the user via the user interface screen in the intermediate state in step S5-12. For example, in a case in which two pages of document data are input in an input process in step S5-2, and then, in an intermediate state, Insert Sheet and "Copy on Inserted Sheet" (or "Copy on Tab Sheet") are selected, table data for two output pages is described in the page table. In this case, the second page of the document data input in this input process is printed on an insertion sheet. Also in a case in which the user setting in the intermediate state described above is ended without selecting "Insert Sheet", table data for two output pages corresponding to two pages of document data input in the one input process in step S5-2 is described in the page table. In this case, two pages of input document data are respectively printed in the normal print mode. In a case in which in the intermediate state described above, "Insert Sheet", "Don't Copy on Inserted Sheet" (or "Don't Copy on Tab Sheet"), and "Insert Before the Next Page" are selected, two pages of input document data will be printed and one sheet will be simply inserted, without being printed on the inserted sheet. Thus, in this case, table data for a total of three output pages including one inserted sheet is described in the page table. In this case, after two pages of input document data are printed in the normal print mode, one sheet is simply inserted thereafter without being printed thereon. After completion of describing data in the page table, the process proceeds to step S5-15. In step S5-15, the controller 110 determines whether the end key 706 on the user interface screen shown in FIG. 7 is pressed by the user. If the end key 706 has not been pressed, the process proceeds to step S5-16. In step S5-16, it is determined whether the start key 607 is pressed, If the start key 607 is not pressed by the user, the process returns to step S5-6 to maintain the intermediate state in the scan-all-first mode. In this state, the user removes a pile of document sheets, which have been processed in step S5-2, from the document tray or the platen glass and puts a new pile of document sheets to be input on the document tray of the ADF or on the platen glass serving as a document plate. In this state, the controller 110 controls the control unit 150 so as to display a user interface screen such as that shown in FIG. 7 on which an instruction message indicating the operation, specifically replacement of documents and pressing of the start key, the user should perform is displayed thereby making it easier for the user to perform the operation. After the document sheets are removed by the user, if the user puts a next subset of document sheets on the document tray of the ADF or puts one of the next subset of document sheets directly on the platen glass and then presses the start key 607 on the control unit 150, the controller 110 returns the processing sequence to step S5-1 to start the input process for the next subset of document sheets.

If the end key 706 on the user interface screen shown in FIG. 7 is pressed by the user and thus the answer to decision step S5-15 becomes "yes", the controller 110 ends the input sequence in the scan-all-first mode.

After completion of the input sequence in the scan-all-first mode, the sequence returns to step S4-2 in the flow chart shown in FIG. 4. In step S4-2, it is determined whether the cancel key is pressed during the sequence in the scan-all-first mode. If yes, the copy job is terminated. However, if no, the process proceeds to step S4-3 to start a print sequence. The print sequence is described below with reference to a flow chart shown in FIG. 13. By way of example, it is assumed that the attribute of the job specified by the user is a copy job and printing is specified as the output process. Note that the digital multifunction apparatus (system) having a plurality of modes is employed as the image input/output apparatus (the image input/output system) according to the present embodiment, as described above, and the digital multifunction apparatus (system) can perform output processing not only in the copy mode but also in one of other modes such as the facsimile mode, the printer mode, etc. In a case in which the digital multifunction apparatus operates in an external input mode such as the facsimile mode or the printer mode, the copy job in the flow chart is replaced with an external input job. In a case in which a box registration process or a process of transmitting to an external apparatus is specified as the output process instead of the print process, the process in step S4-3 is replaced with the box registration process or the transmission process. The present digital multifunction apparatus according to the present embodiment controls various units in an optimum manner depending on the attribute of a job to be processed and the specified output mode. In any case, the present invention may be applied, regardless of the operation mode or the output processing mode.

Figure 13:
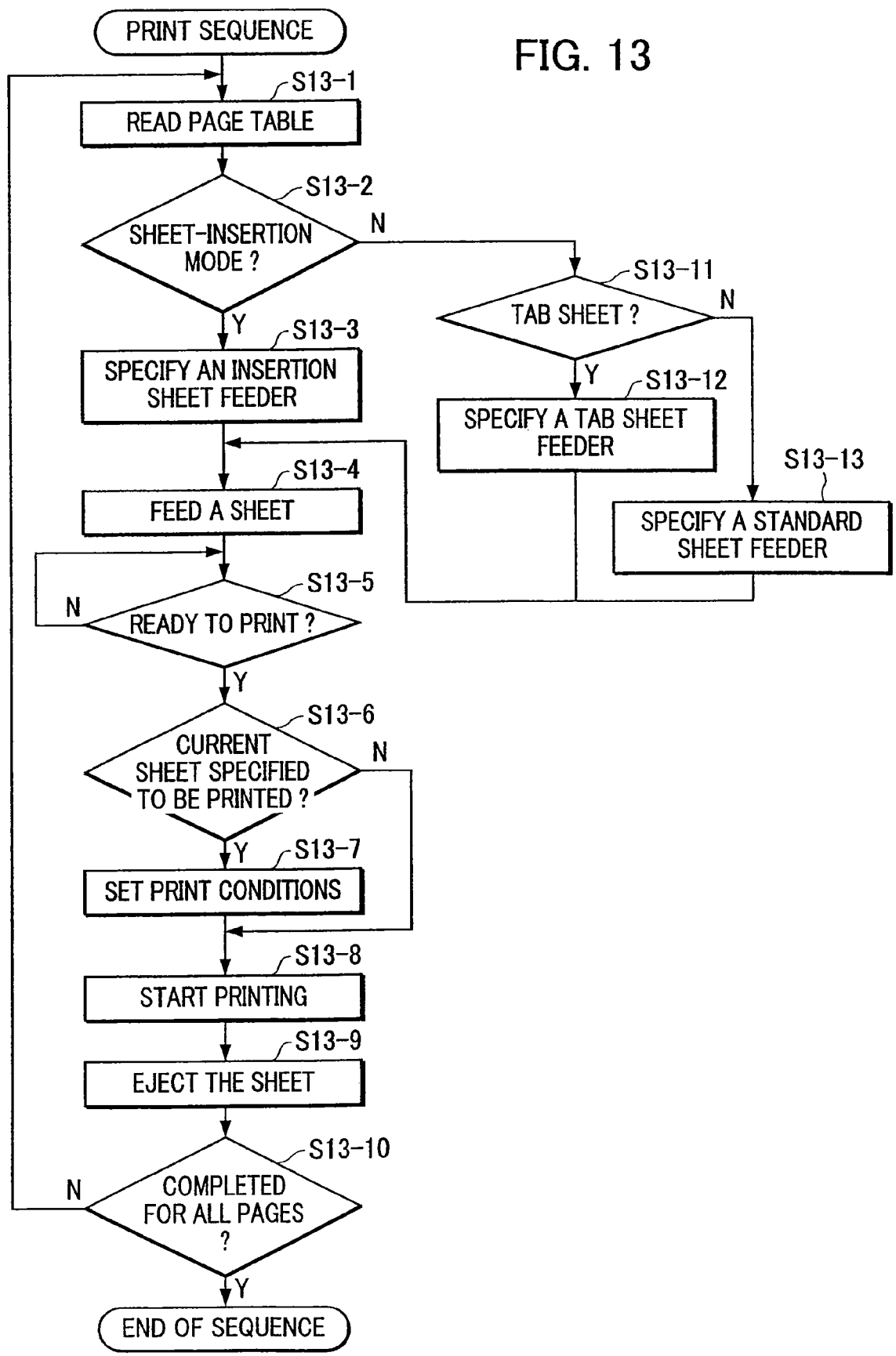
FIG. 13 is a flow chart showing a process according to an embodiment of the present invention.

In step S13-1 in the flow chart shown in FIG. 13, the controller 110 accesses the page table stored on the hard disk to acquire information associated with the job to be processed in the scan-all-first mode. More specifically, the controller 110 reads information at the top of the page table shown in FIG. 12. In this specific example, information on the first output page is described at the top of the page table, and thus the controller 110 examines the information described in the page table in the order of increasing output page number starting from the first output page. In a case in which data indicating the output order can be described in the page table, and data can be read from the page table on the basis of the output order, information may be described in a random fashion in the page table.

In the next step S13-2, it is determined, on the basis of the information described in the page table, whether the sheet insertion mode has been specified by the user via user interface screens shown in FIGS. 7 to 11 displayed on the control unit 150 in an intermediate state in the scan-all-first mode. If the answer to step S13-2 is yes, if the sheet insertion key on the user interface screen shown in FIG. 7 is selected and further an insertion sheet is selected as an insertion sheet via the user interface screen shown in FIG. 8, the process proceeds to step S13-3 to specify an insertion sheet feeder for supplying an insertion sheet to be used by the printer unit 200 as the sheet for the output page. If the answer to decision step S13-2 is no, the process jumps to step S13-11. In step S13-11, it is determined, on the basis of the information described in the page table, whether a tab sheet is specified. If the answer to decision step S13-11 is yes, for example, if the sheet insertion key on the user interface screen shown in FIG. 7 is selected and further a tab sheet is selected as an insertion sheet via the user interface screen shown in FIG. 8, the process proceeds to step S13-12 to specify a tab sheet feeder for supplying a tab sheet to be used by the printer unit 200 as the sheet for the output page. In a case in which the answer to decision step S13-11 is no, for example, in a case in which the sheet insertion key on the user interface screen shown in FIG. 7 is not selected, or in a case in which the sheet insertion is cancelled, the process jumps to step S13-13 to specify a normal sheet feeder for supplying a normal sheet to be used by the printer unit 200 as the sheet for the output page.

If specifying of the sheet feeder is completed via one of steps S13-3, S13-12 and S13-13, the process proceeds to step S13-4. In step S13-4, a sheet is fed from the specified sheet feeder. More specifically, in a case in which an insertion sheet feeder is specified in step S13-3, a sheet is fed from the specified insertion sheet feeder. On the other hand, in a case in which a tab sheet feeder is specified in step S13-12, a tab sheet is fed from the specified tab sheet feeder. In a case in which a normal sheet feeder is specified in step S13-13, a normal sheet is fed from the specified normal sheet feeder. In the next step, step S13-5, it is determined whether the apparatus has become ready to start printing. More specifically, it is determined whether the sheet from the specified sheet feeder has been transported via the sheet transport path 331 until it has reached a position near the image transfer unit 325. This determination is made on the basis of information supplied from sheet sensors disposed at plural locations in the sheet transfer path. If the answer to decision step S13-5 is no, the process waits until the sheet has arrived at the image transfer unit 325. If the answer to decision step S13-5 is yes, the process proceeds to step S13-6. In step S13-6, the page table data, shown in FIG. 12, stored in the memory is examined to determine whether it is specified that printing on the present output page should be performed. If yes, setting is made so that a corresponding document is to be printed in accordance with the page table data. For example, in a case in which row 723 in the table shown in FIG. 12 is currently being processed, setting is made so that the first page of the input document data is printed on a normal sheet supplied from the normal sheet feeder thereby producing a first output page. On the other hand, in a case in which row 724 in the table shown in FIG. 12 is currently being processed, settings are made such that the third page of the input document data is printed on an insertion sheet thereby producing a third output page. If the answer to decision step S13-6 is no, settings are made such that printing is not performed. For example, in a case in which row 725 in the table shown in FIG. 12 is currently being processed, an insertion sheet is used for a sixth output page, but the insertion sheet is directly ejected onto the ejected-sheet tray without printing on the insertion sheet.

In the next step S13-8, printing is started. After completion of the printing, the process proceeds to step S13-9 to eject the sheet. For any output page specified not to be printed thereon in step S13-7, for example, for sixth output page, as specified in row 725 in the page table shown in FIG. 12, printing in step S13-8 is not performed and a sheet is simply output in step S13-9.

In the next step S13-10, it is determined whether outputting is completed for all output pages described in the page table (that is, for all of the output pages 1 to N described in the table shown in FIG. 12). If no, the process returns to step S13-1. However, if yes, the print sequence is ended. If the print sequence is completed, the process returns to the flow chart shown in FIG. 4 and the copy job is completed.

A specific example of a process is described below with reference to FIGS. 22A and 22B. In the example shown in FIGS. 22A and 22B, input document data is processed in the scan-all-first mode, under the control of the controller 110, in accordance with the flow charts shown in FIGS. 4, 5, and 13 and in accordance with the table data shown in FIG. 12. However, in this example, it is assumed that the table information described in row 725 in the page table shown in FIG. 12 indicates that a tab sheet is specified as the sheet instead of the insertion sheet and the print mode is specified such that printing on the tab sheet is not performed instead of printing on the insertion sheet.

Figure 22A:
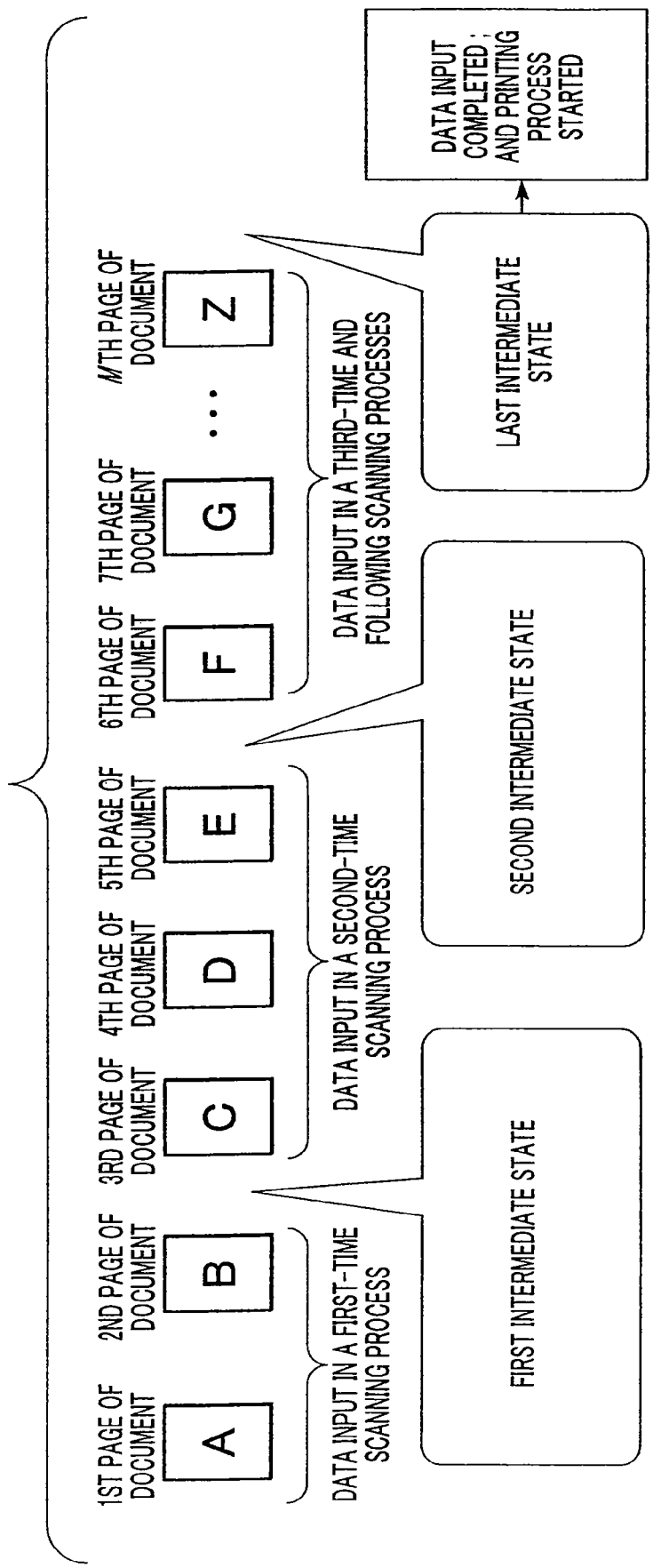
FIGS. 22A and 22B are diagrams showing sample inputs and output sheets according to an embodiment of the present invention.

FIG. 22A shows a set of document sheets input part by part via a plurality of input processes in the scan-all-first mode. FIG. 22A also shows when intermediate states in the scan-all-first mode occur and how setting is made by a user in the respective intermediate states.

In this specific example, as can be seen from the page table shown in FIG. 12, there are M document pages to be processed. The M document pages are divided into three sets of document sheets, and they are input separately using the ADF of the apparatus via three input processes. Of the full set of document sheets, two pages including a first page and a second page are input in a first time input process, three pages including third to fifth pages are input in a second time input process, and (M-5) pages including sixth to Mth pages are input in a third time input process. Herein, it is assumed that the scan-all-first mode has been already set by the user via the control unit 150.

In step S5-2 shown in FIG. 5, the controller 110 performs the first time input process in the scan-all-first mode by sequentially scanning, using the reader unit 200, the first document page and the second document page of the subset of document sheets put on the document tray of the ADF and storing the resultant document data on the hard disk of the image storage unit 160. If the inputting of data in the first time input process is completed (and thus the controller 110 receives, from a sensor, information indicating that there is no more document on the document tray), the controller 110 determines that the process has entered into a first time intermediate state in the scan-all-first mode and the controller 110 controls the control unit 150 so as to display intermediate user interface screens, such as those shown in FIGS. 7 to 11. For example, the user selects "Insert Sheet" on the user interface screen shown in FIG. 7, selects "Copy" on the inserted sheet on the user interface screen shown in FIG. 8, selects "Next Page" on the user interface screen shown in FIG. 9, and selects a colored sheet feeder as a sheet feeder for feeding the insertion sheet on the user interface screen shown in FIG. 10 or 11. In the above process, the controller 110 describes data associated with the first to third output pages in the page table shown in FIG. 12. In this intermediate state, the user puts a subset of document sheets including the third to fifth pages, to be input in the second time input process, on the document tray of the ADF. After the subset of document sheets is put on the ADF, the user presses the start key on the control unit 150.

In response to pressing of the start key by the user, the controller 110 starts the second time scanning process in the scan-all-first mode. More specifically, the controller 110 returns the process sequence to step S5-2 to sequentially scan, using the reader unit 200, the third to fifth document pages included in the subset of document sheets put on the document tray of the ADF and store the resultant document data on the hard disk of the image storage unit 160. If the inputting of data in the third time scanning process is completed, and the controller 110 receives, from a sensor, information indicating that there is no more document on the document tray, the controller 110 determines that the process has entered into a second time intermediate state in the scan-all-first mode and the controller 110 controls the control unit 150 so as to display intermediate user interface screens such as those shown in FIGS. 7 to 11. For example, the user selects "Insert Sheet" on the user interface screen shown in FIG. 7, Don't Copy" on the tab sheet on the user interface screen shown in FIG. 8, "Insert before the Next Page" on a user interface screen (not shown), and "Tab Sheet Feeder" as the sheet feeder for feeding the insertion sheet on the user interface screen shown in FIG. 10 or 11. In the above process, the controller 110 describes data associated with the fourth to sixth output pages in the page table shown in FIG. 12. In this intermediate state, the user puts a subset of document sheets including the sixth to Mth pages, to be input in the third time input process, on the document tray of the ADF. After the subset of document sheets is put on the ADF, the user presses the start key on the control unit 150.

In response to pressing of the start key by the user, the controller 110 starts the third time input process in the scan-all-first mode. More specifically, the controller 110 returns the process sequence to step S5-2 to sequentially scan, using the reader unit 200, the sixth to Mth document pages of the subset of document sheets put on the document tray of the ADF and store the resultant document data on the hard disk of the image storage unit 160. (and thus the controller 110 receives, from a sensor, information indicating that there is no more document on the document tray), the controller 110 determines that the process has entered into a third time intermediate state in the scan-all-first mode and the controller 110 controls the control unit 150 so as to display intermediate user interface screens, such as those shown in FIGS. 7 to 11. In the above process, the controller 110 describes data associated with the seventh to Nth (last) output pages in the page table shown in FIG. 12. The total number of output pages becomes equal to the sum of the number of output pages specified as "Insert Sheet" and "Don't Copy" and the number of the input document pages. In the present example, the sixth output page is specified as "Insert Sheet" and "Don't Copy", and thus the total number of output pages, N, is equal to the number of input document pages plus 1.

If the end key 706 on the user interface screen shown in FIG. 7 is pressed by the user in the third time intermediate state, the controller 110 combines together the document data including the document data of the first and second document pages, the document data of the third to fifth document pages, and the document data of the sixth to Mth document pages, which have been input in the three input processes and stored on the hard disk. The controller 110 then performs an output process as a single job in accordance with the page order specified in the page table wherein the controller 110 controls various units such as the image storage unit 160 and the printer unit 300, so that a sheet, an insertion sheet or a tab sheet, of a type specified by the user via a user interface screen (such as those shown in FIGS. 7 to 11) displayed in an intermediate state in the scan-all-first mode is inserted at a page position specified by the user via a user interface screen in a manner (output mode such as "Print on the Inserted Sheet" or "Don't Print on the Inserted Sheet") specified by the user via a user interface screen.

Figure 22B:
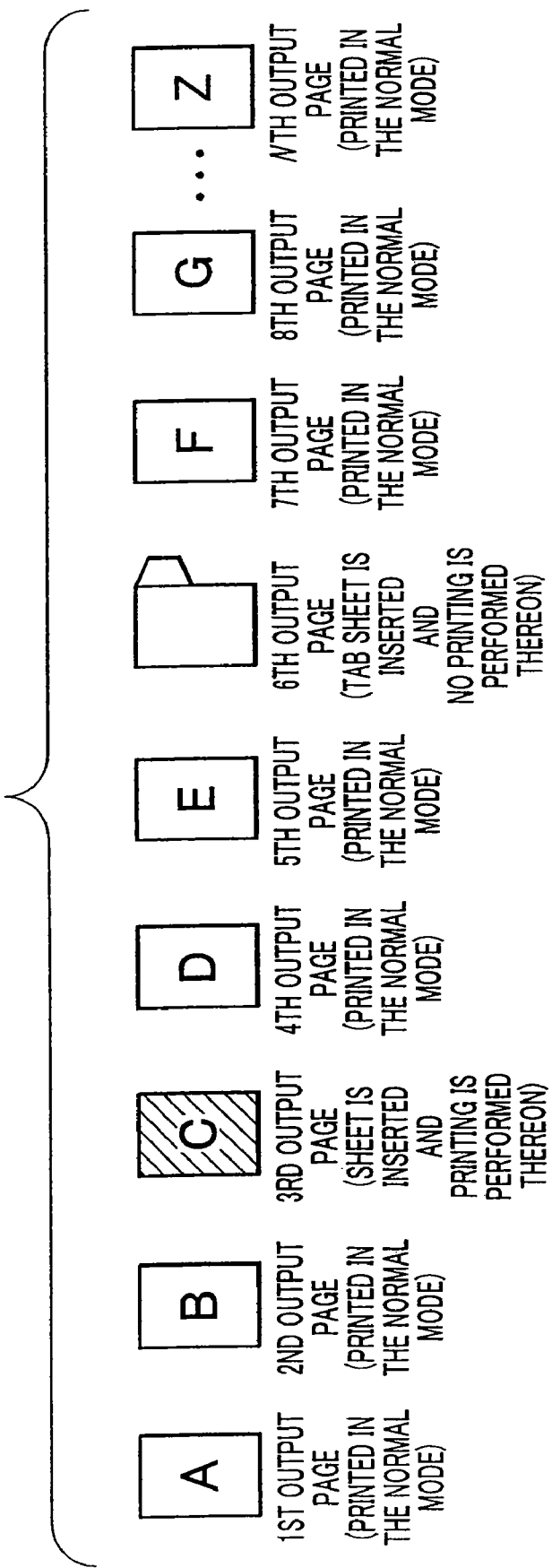

FIG. 22B shows output pages obtained in the job described above.

Of the output pages in the single job, first and second output pages are processed in the normal print mode using normal paper sheets supplied from the normal sheet feeder. More specifically, the printer unit 300 prints the first page (A) of the input document data on the first sheet and ejects the resultant printed sheet onto the ejected-sheet tray thereby producing the first output page, and then prints the second page (B) of the input document data on the second sheet and ejects the resultant printed sheet onto the ejected-sheet tray thereby producing the second output page.

Of the output pages in the present job, a third output page is processed in accordance with "Insert Sheet and Copy", wherein colored paper supplied from a specified insertion sheet feeder is employed for the third output page. More specifically, the printer unit 300 prints the third page (C) of the input document data on colored paper given as a third sheet and ejects the resultant printed sheet onto the ejected-sheet tray thereby producing the third output page. Fourth and fifth output pages are processed in the normal print mode using sheets supplied from the normal sheet feeder. More specifically, the printer unit 300 prints the fourth page (D) of the input document data on a fourth sheet and ejects the resultant printed sheet onto the ejected-sheet tray thereby producing the fourth output page, and then prints the fifth page (E) of the input document data on a fifth sheet and ejects the resultant printed sheet thereby producing the fifth output page.

Of the output pages in the present job, a sixth output page is processed in accordance with "Insert Tab Sheet" and "Don't Copy", wherein a tab sheet supplied from a specified tab sheet feeder is employed fro the sixth output page. More specifically, for the sixth output page, the printer unit 300 performs an operation in accordance with the processing conditions specified in the page table such that a tab sheet is simply output, without being printed, from a specified sheet feeder onto the ejection tray.

Of the output pages in the present job, seventh output page to Nth page (last page) are processed in the normal print mode using selected sheets (normal sheets). More specifically, the printer unit 300 prints the sixth page (F) of the input document data on a seventh sheet and ejects the resultant printed sheet onto the ejected-sheet tray thereby producing the seventh output page, and then prints the seventh page (G) of the input document data on an eight sheet and ejects the resultant printed sheet onto the ejected-sheet tray thereby producing the eight output page. A similar process is performed until the last output page has bee processed. For the last output page (Nth output page), the last page (Mth page) (Z) of the input document is printed and output onto the ejected-sheet tray.

According to the present embodiment, as described above, a plurality of document data input separately via a plurality of input processes in the scan-all-first mode can be dealt with in a single job. Furthermore, users can make settings, for example, in terms of conditions in the sheet insertion mode, as in the above example, in an intermediate state after the inputting of data in the scan-all-first mode is started and before the output process of the data is started, and the following process for the data to be dealt with in the single job can be performed in accordance with the conditions set in the intermediate state. A plurality of document data input separately via a plurality of input processes can be processed as one group of data as a single job in a manner in which the processing conditions set by a user in an intermediate state in the scan-all-first mode are reflected.

The technique disclosed above makes it unnecessary to set processing conditions such as those associated with the sheet insertion before inputting of document data to be processed is started. That is, a user is allowed to make settings of the processing conditions associated with sheet insertion at a time after the input of document data is started. Furthermore, the scan-all-first mode makes it possible to deal with document data including a large number of pages which cannot be input all at one time. That is, in the scan-all-first mode, a set of document sheets is input part by part, and an intermediate state is provided after completion inputting of a part of the set of document sheets and before starting inputting of a following part, to allow a user to make settings. This allows the user to correctly and easily determine positions at which sheets should be inserted, on the basis of visual observation. The inputting of document data on the part-by-part basis allows the user to easily distinguish a part which has been already processed and a part which should be processed next. Furthermore, it becomes possible to deal with a small number of document sheets in one input process, and thus it becomes easy to determine at which page a sheet should be inserted. This allows the user to easily make settings of details of processing conditions. In the technique according to the present embodiment, unlike the conventional technique in which users have to calculate pages at which to insert sheets, which can often cause an error, users can easily make settings associated with sheet insertion in a highly reliable fashion.

Second Embodiment

A second embodiment of the present invention is described below.

Figure 16:
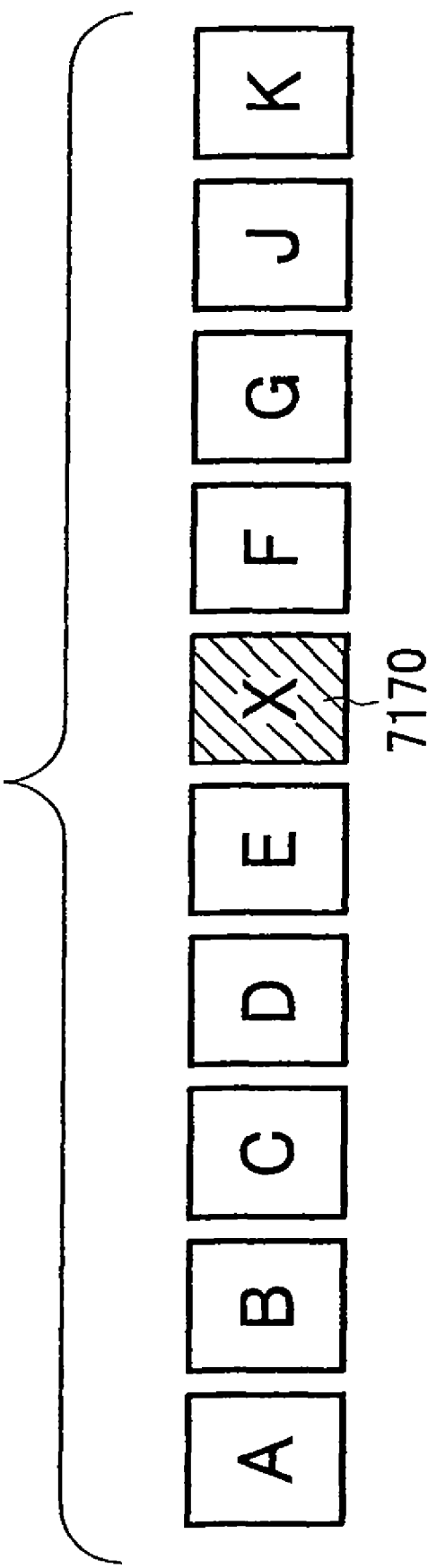
FIG. 16 is a diagram showing a sample output according to an embodiment of the present invention.

A technique of combining a form image with document data is known in the art of an image forming apparatus or system including built-in memory such as a hard disk, such as a digital copying machine or a digital multifunction machine. This technique is referred to herein as a composite-with-form mode. In the composite-with-form mode, an arbitrary number of form images are stored in a memory such as a hard disk in advance. In an output process such as a printing process, one of the form images stored in the memory is selected by a user and combined with one or more pages of input document data or the selected form image is simply inserted between pages of document data. In this second embodiment, the present invention is applied to an image forming apparatus having a composite-with-form mode capability, as described below. First, the composite-with-form mode is described in further detail with reference to FIG. 16. FIG. 16 shows an example of a set of output pages obtained in the composite-with-form mode. In this specific example, a form image X (7170) is selected from form images stored on the hard disk of image storage unit 160 and inserted between a fifth document page E and a sixth document page F of a full set of input document images A to K including a total of nine pages. The present invention is also advantageous in such a composite-with-form mode.

In the apparatus or the system according to the present invention, settings of processing conditions in the scan-all-first mode may be allowed only for one mode such as the sheet insertion mode disclosed in the first embodiment or the composite-with-form mode disclosed in the second mode, or may be allowed for two or more modes, for example for both the sheet insertion mode and the composite-with-form mode. The present invention may be applied to an apparatus or a system capable of making settings of processing conditions in the scan-all-first mode at least for one of these modes. In this second embodiment, the user interface screen for setting processing conditions associated with sheet insertion in the scan-all-first mode according to the first embodiment is replaced with a user interface screen for setting processing conditions associated with composite-with-form processing in the scan-all-first mode, and the flow charts in the first embodiment are replaced with corresponding flow charts, while the other elements or processes in the second embodiment are similar to those in the first embodiment, although they are not described herein.

Figure 17:
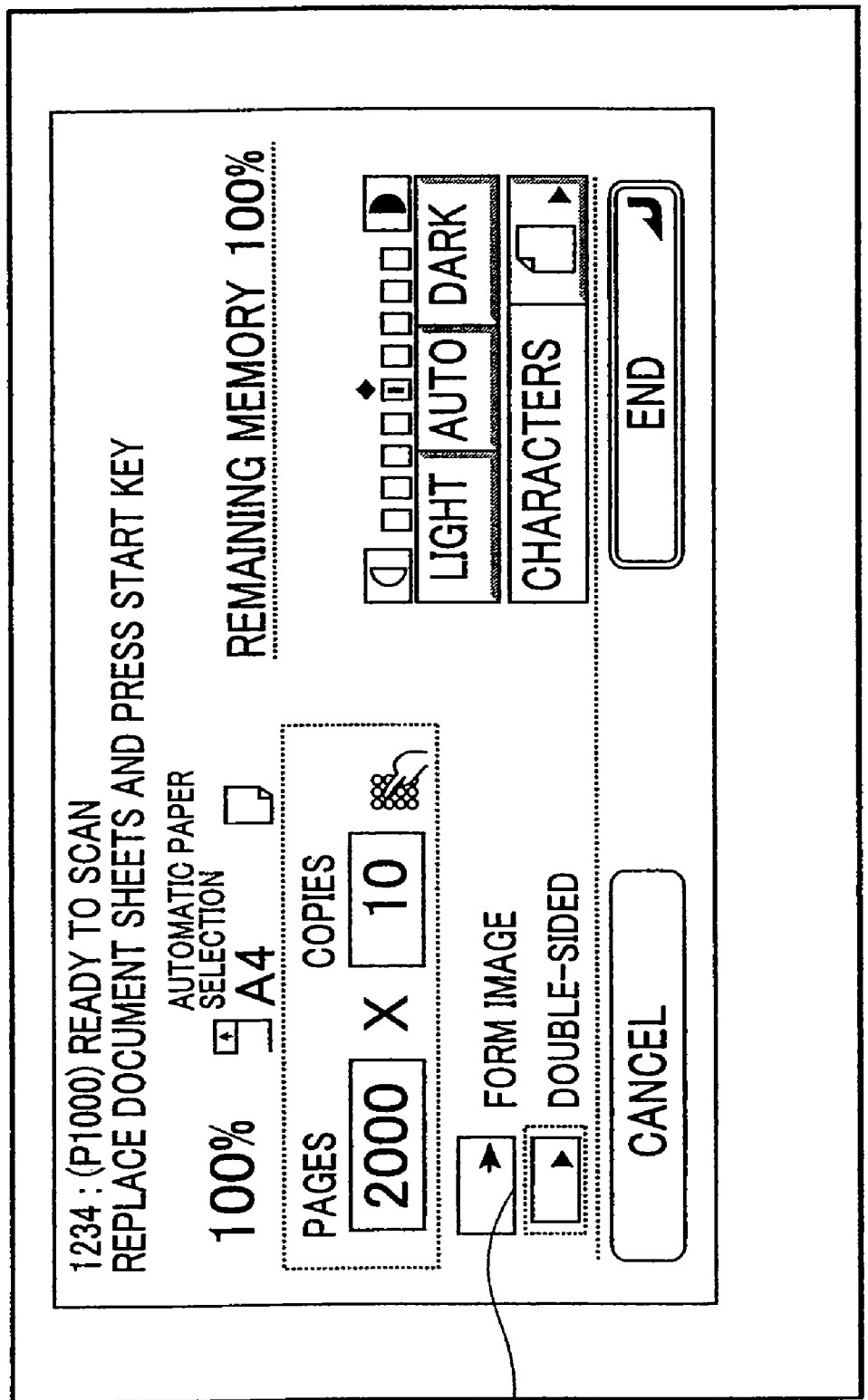
FIG. 17 is a diagram showing an example of a user interface screen according to an embodiment of the present invention.

FIG. 17 shows a user interface screen displayed on the control panel of the control unit 150 by the controller 110 in the intermediate state in the scan-all-first mode. This user interface screen is similar to the user interface screen shown in FIG. 7 which is also displayed in the intermediate state in the scan-all-first mode, except that it is allowed to make settings associated with some different processing conditions.

The user interface screen shown in FIG. 17 is displayed in a similar manner in a similar situation as in the previous embodiment. More specifically, the controller 110 displays the user interface screen shown in FIG. 17 in step S5-5 in the flow chart shown in FIG. 5. Steps before S5-5 in the flow chart shown in FIG. 5 are performed in a similar manner as in the previous embodiment described above. The user interface screen shown in FIG. 17 is displayed by the controller 110, as with the user interface screen shown in FIG. 7, at a proper time after the inputting of document data in the scan-all-first mode is started and before the outputting process, in a single job, of the document data from the hard disk of the image storage unit 160 is started. In the present embodiment, as in the previous embodiment, this user interface screen is displayed whenever the intermediate state in the scan-all-first mode occurs after completion of inputting of a pile of document data in the ADF mode (or after completion of inputting of one document sheet using the platen.

The user interface screen shown in FIG. 17 is similar to that shown in FIG. 7 except for a composite-with-form key 727. The user interface screen shown in FIG. 17 is produced by the control unit 150, under the control of the controller 110, on the basis of the data stored in the memory (not shown) of the image storage unit 160 such as the display data, the data indicating the processing conditions specified by the user, and the data indicating the operation status of the apparatus. If the composite-with-form key 727 on the user interface screen shown in FIG. 17 is pressed, the controller 110 controls the control unit 150 so as to switch the displayed screen to a form image setting screen such as that shown in FIG. 18.

Figure 18:
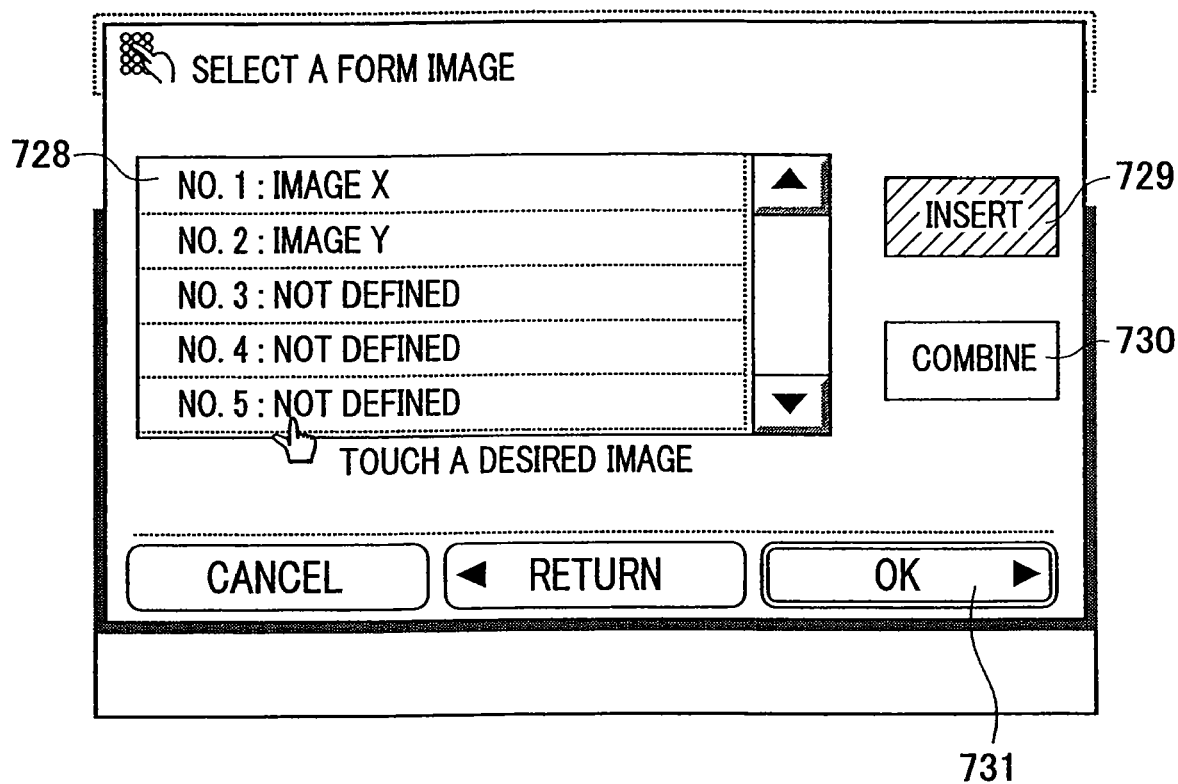
FIG. 18 is a diagram showing an example of a user interface screen according to an embodiment of the present invention.

The screen shown in FIG. 18 includes an area for allowing the user to select one of the form images stored on the hard disk of the image storage unit 160 and also an area for allow the user to specify an output mode in which the selected form image should be output. For example, the user may select one of two modes: a composite mode in which a selected form image and an input document image are combined, and a resultant composite image is printed on a sheet; and a form image insertion mode in which only a form image is printed on a sheet without combining the form image with a document image and the printed sheet is inserted between pages on which document images are printed.

In the specific example shown in FIG. 17, a form image having a name "Image X" with a form image number 1 and a form image having a name "Image Y" with a form image number 2 are stored on the hard disk.

On the screen shown in FIG. 18, the user can select a desired form image from a list 728 in which form images stored on the hard disk are listed. A key 729 is used to specify the insertion mode in which a form image selected from the list 728 is inserted between specified pages on which document images are printed. In this mode, the form image is not combined with a document image, but only the form image is printed on a sheet and the resultant printed sheet is inserted between pages on which document images are printed. A key 730 is used to specify the composite mode in which a form image selected from the list 728 is combined with a specified document image and a composite image is printed on a sheet. In the case in which the composite mode is selected by pressing the key 730, a document image to be combined with the form image selected from the list 728 can be specified by the user via a user interface screen which will be described later. In the selection, only one of key 729 or 730 can be selected. The controller 110 controls the control unit 150 so as to allow the user to select only one of the keys 729 and 730. If the composite mode is selected by the user by pressing the key 730 and the OK key 731 on the screen is then pressed, the controller 110 controls the control unit 150 so as to switch the screen displayed on the control panel to a screen such as that shown in FIG. 19.

Figure 19:
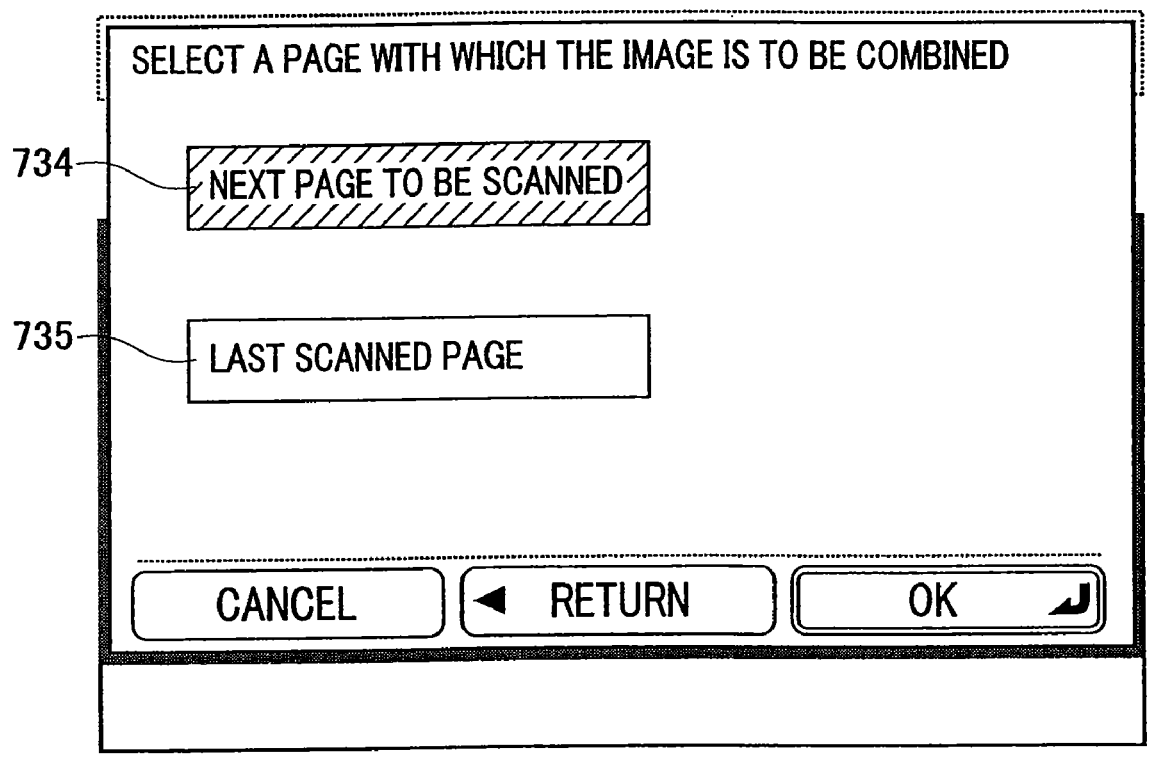
FIG. 19 is a diagram showing an example of a user interface screen according to an embodiment of the present invention.

The user interface screen shown in FIG. 19 is displayed, as described above, when the composite key 730 on the user interface screen shown in FIG. 18 is pressed. On the other hand, in the case in which the insertion key 729 on the user interface screen in FIG. 18 is selected, a user interface screen different from that shown in FIG. 19 is displayed so that the user is allowed to specify a position at which a sheet having a form image printed thereon should be inserted.

On the user interface screen shown in FIG. 19, the user is allowed to specify which page of the set of document data input in the scan-all-first mode should be combined with a form image selected via the user interface screen shown in FIG. 18, in the composite mode selected by pressing the composite key 730 on the user interface screen shown in FIG. 18.

If a key 734 on the user interface screen shown in FIG. 19 is selected by the user, the controller 110 selects document image data which will be input first in a next input process performed in repetition of step S5-2, and thus which has not input yet at the present time, as a document image with which to combine the selected form image. The controller 110 then controls related units such as the reader unit 200, the image storage unit 160, the printer unit 300, and the control unit 150, so that the selected document data and the selected form image are combined and printed. On the other hand, in the case in which a key 735 on the user interface screen shown in FIG. 19 is selected by the user, of the subset of document data which has already been input and stored on the hard disk in the input process including repetition of step S5-2, a last document page, input at the end of the above input process, is selected as the document image with which to combine the selected form image, and the controller 110 then controls related units, such as the reader unit 200, the image storage unit 160, the printer unit 300, and the control unit 150, so that the selected document data and the selected form image are combined and printed.

As for the keys 734 and 735, like the keys 729 and 730, only one of them can be selected. The respective processing conditions, for the document data to be processed in the scan-all-first mode, concerning the form image set by the user via the user interface screens such as those shown in FIGS. 17 to 19 displayed in the intermediate state in the scan-all-first mode are reflected in table data which is produced in step S5-13 in a similar manner to the table data shown in FIG. 12.

Figures 20, 21:
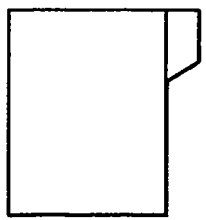
FIG. 20 is a diagram showing an example of table data according to an embodiment of the present invention.
FIG. 21 is a diagram depicting an example of a tab sheet.

The controller 110 creates a page table on the memory as shown in FIG. 20 in a similar manner as in the previous embodiment described above.

In the specific example shown in FIG. 20, table data is produced for M-page document data input part by part via at least three input processes in the scan-all-first mode. More specifically, the table data is produced by the controller 110 in such a situation as described below. For example, when a set of document sheets is given, if first and second pages are scanned and resultant document data is stored on the hard disk in a first time input process in the scan-all-first mode; third to fifth pages are scanned and resultant document data is stored on the hard disk in a second time input process; and sixth to Mth pages are scanned and resultant document data is stored on the hard disk in a third time input process, and if in a first time intermediate state in the scan-all-first mode after completion of the first time input process and before the start of the second time input process, the user makes selections via the user interface screens such as those shown in FIGS. 17 to 19 displayed on the control unit 150 by pressing the composite-with-form key 727 on the user interface screen shown in FIG. 17, selecting the form image #1 and pressing the composite key 730 on the user interface screen shown in FIG. 18, and pressing the next page key 734 on the user interface screen shown in FIG. 19; in a second time intermediate state in the scan-all-first mode after completion of the second time input process and before the start of the third time input process, the user makes selections via user interface screens displayed on the control unit 150 by pressing the composite-with-form key 727 on the user interface screen shown in FIG. 17, selecting the form image #2 and pressing the insertion key 729 on the user interface screen shown in FIG. 18, and pressing a key (not shown) on a user interface screen (not shown) to specify that the form image should be inserted before a page which will be scanned next; and in a third time intermediate state in the scan-all-first mode after completion of the third time input process, the user presses the end key on the user interface screen shown in FIG. 17, then the table data is produced on the memory by the controller 110 as shown in FIG. 20. As described earlier in the first embodiment, similar table data to that shown in FIG. 20 can be produced not only in the above-described manner and situation but also in a different manner and situation. For example, in a case in which intermediate states appear one page after the respective intermediate states in the above-described example, if the last page key 735 is selected on the user interface screen shown in FIG. 19, a data table similar to that shown in FIG. 20 is also produced.

In the data table shown in FIG. 20, row 732 indicates that the form image #1 of those stored on the hard disk should be combined with the document data of the third page and the resultant composite image should be printed, as a third output page, on a sheet fed from the normal sheet feeder. In the same data table, row 733 indicates that the form image #2 stored on the hard disk should be printed on a sheet fed from the normal sheet feeder without combining the form image #2 with document data and the resultant printed sheet should be inserted as a sixth output page after a sheet on which the document data of the fifth page is printed, before a sheet on which the document data of the sixth page is printed.

The operation sequence of reading and printing data according to the page table can be performed in a similar manner as in the previous embodiment described earlier, and thus a further description thereof is not given here.

A specific example is described below with reference to FIGS. 23A and 23B, which show a manner in which a set of document data is input and output in the scan-all-first mode under the control of the controller 110 in accordance with flow charts shown in FIGS. 4, 5, and 15 and a similar flow chart (not shown) which does not include steps relating to a composite-with-form process.

Figure 23A:
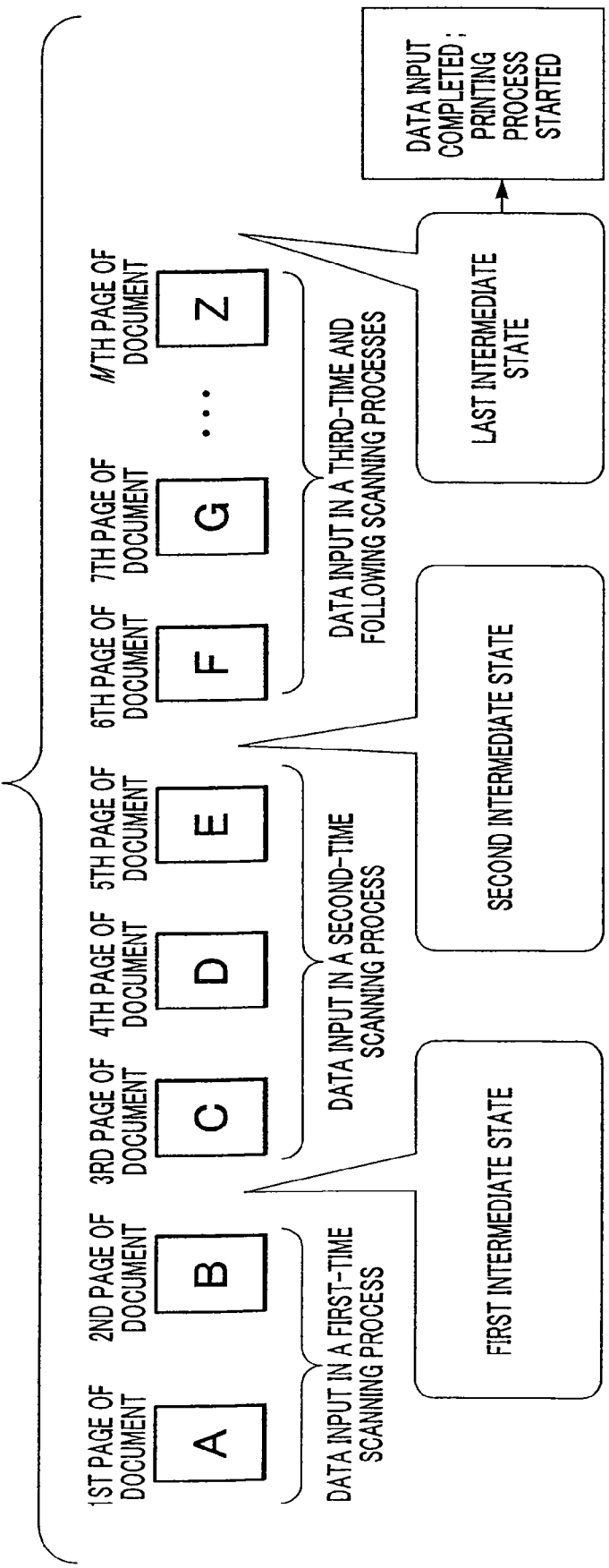
FIGS. 23A and 23B are diagrams showing sample inputs and output sheets according to an embodiment of the present invention.

FIG. 23A shows a manner in which a set of document sheets is input part by part via a plurality of input processes in the scan-all-first mode, and also shows how intermediate states appear and a manner in which the user makes settings in the intermediate states.

In the example shown in FIG. 23A, inputting is performed for a total of M pages as described in the data table shown in FIG. 20. A set of documents including M pages is input using the ADF of the apparatus part by part via three input processes. Of the full set of document sheets, two pages, including a first page and a second page, are input in a first time input process, three pages, including third to fifth pages, are input in a second time input process, and (M-5) pages, including sixth to Mth pages, are input in a third time input process. It is assumed that the scan-all-first mode has been already set by the user via the control unit 150.

In step S5-2 shown in FIG. 5, the controller 110 performs the first time input process in the scan-all-first mode by sequentially scanning, using the reader unit 200, the first document page and the second document page of the subset of document sheets put on the document tray of the ADF and storing the resultant document data on the hard disk of the image storage unit 160. If the inputting of data in the first time input process is completed and the controller 110 receives, from a sensor, information indicating that there is no more document on the document tray, the controller 110 determines that the process has entered into a first time intermediate state in the scan-all-first mode and the controller 110 controls the control unit 150 so as to display intermediate user interface screens such as those shown in FIGS. 17 to 19. In this situation, for example, the user makes selections in such a manner that the composite-with-form key is pressed on the user interface screen shown in FIG. 17, the form image #1 is selected and the composite key is pressed on the user interface screen shown in FIG. 18, the next page key is pressed on the user interface screen shown in FIG. 19, and a normal sheet feeder is selected on a user interface screen (not shown). In the above process, the controller 110 describes data associated with the first to third output pages in the page table shown in FIG. 20. In this intermediate state, the user puts a subset of document sheets including the third to fifth pages, to be input in the second time input process, on the document tray of the ADF. After the subset of document sheets is put on the ADF, the user presses the start key on the control unit 150.

In response to pressing of the start key by the user, the controller 110 starts the second time input process in the scan-all-first mode. More specifically, the controller 110 returns the process sequence to step S5-2 to sequentially scan, using the reader unit 200, the third to fifth document pages of the subset of document sheets put on the document tray of the ADF and store the resultant document data on the hard disk of the image storage unit 160. If the inputting of data in the second time input process is completed and thus the controller 110 receives, from a sensor, information indicating that there is no more document on the document tray, the controller 110 determines that the process has entered into a second time intermediate state in the scan-all-first mode and the controller 110 controls the control unit 150 so as to display intermediate user interface screens such as those shown in FIGS. 17 to 19. In this situation, for example, the user makes selections in such a manner that "Composite with Form" is selected on the user interface screen shown in FIG. 17, "Image #2" is selected and the insertion key is pressed on the user interface screen shown in FIG. 18, "Insert before Next Page" is selected on a user interface (not shown), and a normal sheet feeder is selected on a user interface screen (not shown). In the above process, the controller 110 describes data associated with the fourth to sixth output pages in the page table shown in FIG. 20. In this intermediate state, the user puts a subset of document sheets including the sixth to Mth pages, to be input in the third time input process, on the document tray of the ADF. After the subset of document sheets is put on the ADF, the user presses the start key on the control unit 150.

In response to pressing of the start key by the user, the controller 110 starts the third time input process in the scan-all-first mode. More specifically, the controller 110 returns the process sequence to step S5-2 to sequentially scan, using the reader unit 200, the sixth to Mth document pages of the subset of document sheets put on the document tray of the ADF and store the resultant document data on the hard disk of the image storage unit 160. If the inputting of data in the third time input process is completed and the controller 110 receives, from a sensor, information indicating that there are no more documents on the document tray, the controller 110 determines that the process has entered into a third time intermediate state in the scan-all-first mode and the controller 110 controls the control unit 150 so as to display intermediate user interface screens (such as those shown in FIGS. 17 to 19). In the above process, the controller 110 describes data associated with the seventh to Nth (last) output pages in the page table shown in FIG. 20. The total number of output pages becomes equal to the sum of the number of output pages assigned the "Composite-With-Form" mode and "Insert Form Image" and the number of pages of input document data. In the present example, "Insert Form Image" is specified only for the sixth output page, and thus the total number of output pages becomes N equal to the number of pages of input document (M) plus one.

If the end key 706 on the user interface screen shown in FIG. 17 is pressed by the user in the third time intermediate state, the controller 110 combines together the document data including the document data of the first and second document pages, the document data of the third to fifth document pages, and the document data of the sixth to Mth document pages, which have been input in the three input processes and stored on the hard disk, and the controller 110 controls various related units such as the image storage unit 160 or the printer unit 300 so that an output process is performed as a single job in accordance with the page order specified in the page table shown in FIG. 20 such that, in accordance with the processing conditions specified by the user via the user interface screens shown in FIGS. 17 to 19 presented in the intermediate state in the scan-all-first mode, a specified form image specified via the user interface screen shown in FIG. 18 is output at a specified page in a specified output mode (the form image is simply inserted in this specific example).

Figure 23B:
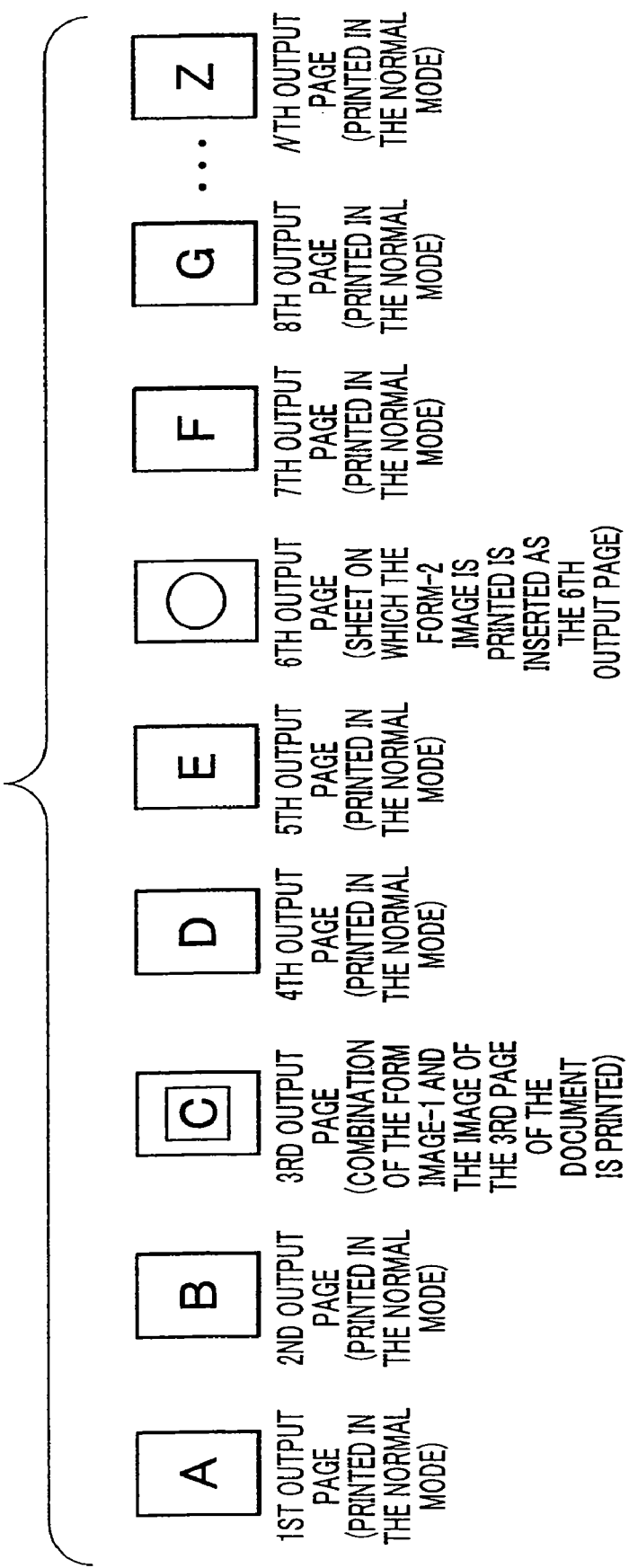

FIG. 23B shows output pages obtained in the job described above.

That is, of the output pages in the single job, first and second output pages are processed in the normal print mode using normal paper sheets supplied from the normal sheet feeder. More specifically, the printer unit 300 prints the first page (A) of the input document data on the first sheet and ejects the resultant printed sheet onto the ejected-sheet tray thereby producing the first output page, and then prints the second page (B) of the input document data on the second sheet and ejects the resultant printed sheet onto the ejected-sheet tray thereby producing the second output page.

Of the output pages in the present job, the third output page is processed so that a composite image of the form image #1 is printed according to the specified conditions. More specifically, the printer unit 300 prints a composite image of the third page (C) of the input document data and the form image #1 on a sheet fed from the normal sheet feeder and ejects the resultant printed sheet onto the ejected-sheet tray.

Fourth and fifth output pages are processed in the normal print mode using sheets supplied from the normal sheet feeder. More specifically, the printer unit 300 prints the fourth page (D) of the input document data on a fourth sheet and ejects the resultant printed sheet onto the ejected-sheet tray thereby producing the fourth output page, and then prints the fifth page (E) of the input document data on a fifth sheet and ejects the resultant printed sheet thereby producing the fifth output page.

Of the output pages in the present job, the sixth output page is processed so that the form image #2 is printed on a sheet and the resultant printed sheet is inserted according to the specified conditions. More specifically, the printer unit 300 prints the form image #2 stored on the hard disk on a normal sheet supplied from a specified normal sheet feeder without combining the form image #2 with input document data and ejects the resultant printed sheet onto the ejection sheet tray.

Of the output pages in the present job, seventh to Nth (last) output pages are processed in the normal print mode using normal paper sheets supplied from the normal sheet feeder. More specifically, the printer unit 300 prints the sixth page (F) of the input document data on a seventh sheet and ejects the resultant printed sheet onto the ejected-sheet tray thereby producing the seventh output page, and then prints the seventh page (G) of the input document data on an eight sheet and ejects the resultant printed sheet onto the ejected-sheet tray thereby producing the eight output page. The remaining pages are processed in a similar manner until the Mth (last) page (Z) of the input document data is printed on an Nth (last) sheet and the resultant printed sheet is ejected onto the ejected-sheet tray thereby producing the Nth (last) output page.

According to the present embodiment, as described above, a plurality of document data input separately via a plurality of input processes in the scan-all-first mode can be dealt with in a single job. Furthermore, users can make settings, for example, can set conditions in the composite mode, as in the above example, in an intermediate state after the inputting of data in the scan-all-first mode is started and before the output process of the data is started, and the following process for the data to be dealt with in the single job can be performed in accordance with the conditions set in the intermediate state. That is, a plurality of document data input separately via a plurality of input processes can be processed as one group of data (as a single job) in a manner in which the processing conditions set by a user in an intermediate state in the scan-all-first mode are reflected.

As described above, the present embodiment provides advantages similar to those achieved by the previous embodiment. Even in a case in which the process includes insertion of a form image at a desired position and/or creation of a composite image, the process can be easily performed without having to set all detailed processing conditions, such as the number of document pages, before the inputting of document data is started, and the data can be printed in a manner specified by the user.

Although the present invention has been described above separately with reference to the first and second embodiments, the techniques disclosed in the first and second embodiments may be combined. More specifically, the apparatus or the system may have both the sheet insertion mode and the composite-with-form mode, or the apparatus or the system may have only one of the sheet inversion mode and the composite-with-form mode. Furthermore, the contents of user interface screens displayed in intermediate states in the scan-all-first mode may be modified, and the manner and situation in which they are displayed may also be modified as required, so as to provide advantages similar to those provided by the first or second embodiment. Some specific examples of modifications are described below with reference to FIGS. 24 to 27.

FIGS. 24 to 27 show examples of user interface screens displayed on the control panel of the control unit 150 under the control of the controller 110. Those user interface screens may be displayed in the form of a touch panel so that users can set processing conditions by directly touching buttons on the screens and so that information indicating processing conditions set is displayed on the screens.

In those examples, many portions are similar to those in the first or second embodiment, and thus only different portions are described below.

Figure 24A:
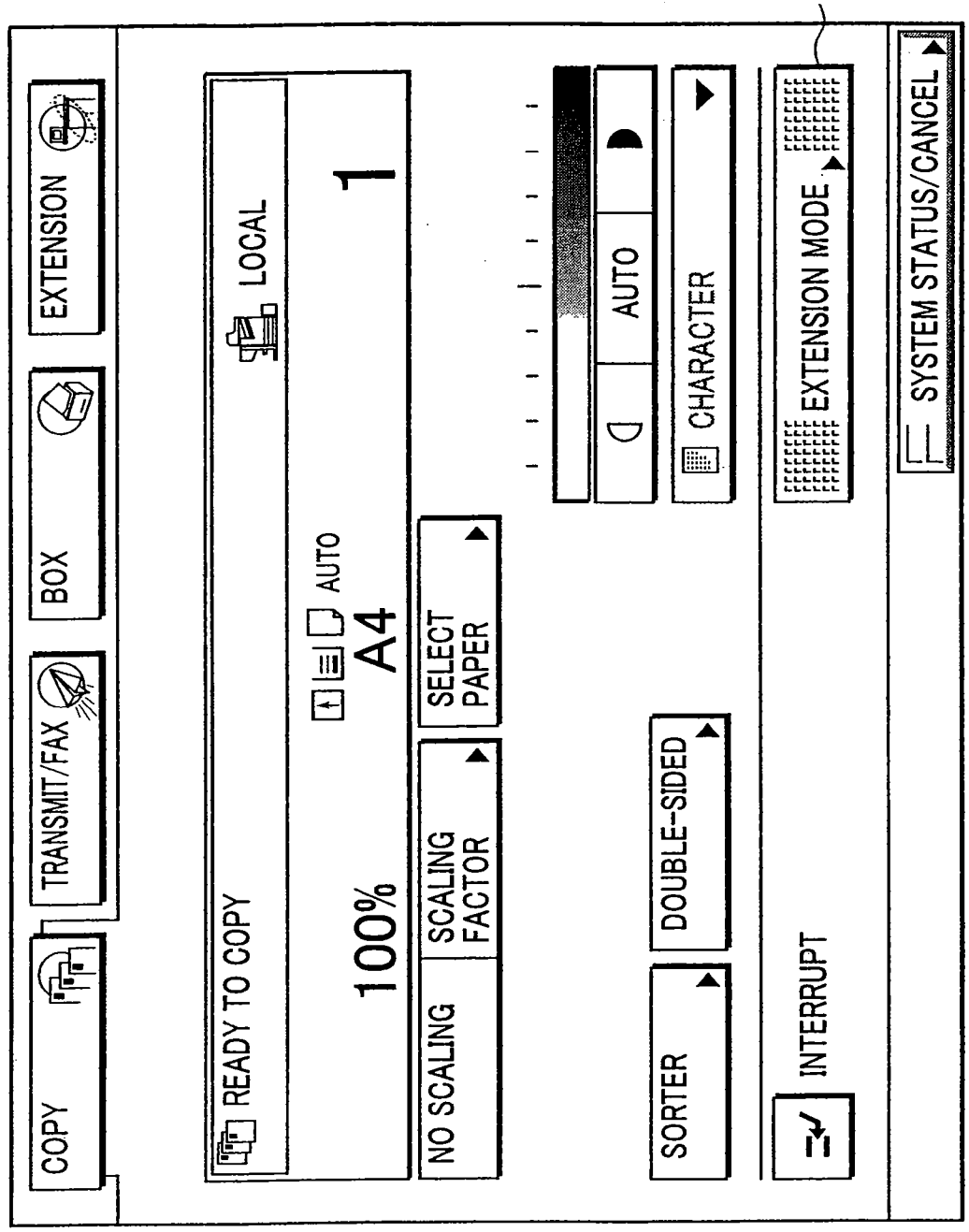

When the apparatus is in an initial state in which no commands have been issued yet by a user, the controller 110 displays the user interface screen shown in FIG. 24A as an initial user interface screen on the display panel of the control unit 150. If the extension key 2400 on the user interface screen shown in FIG. 24A is pressed by the user, the controller 110 controls the control unit 150 so as to display a user interface screen shown in FIG. 24B thereby allowing the user to set various modes.

Figure 24B:
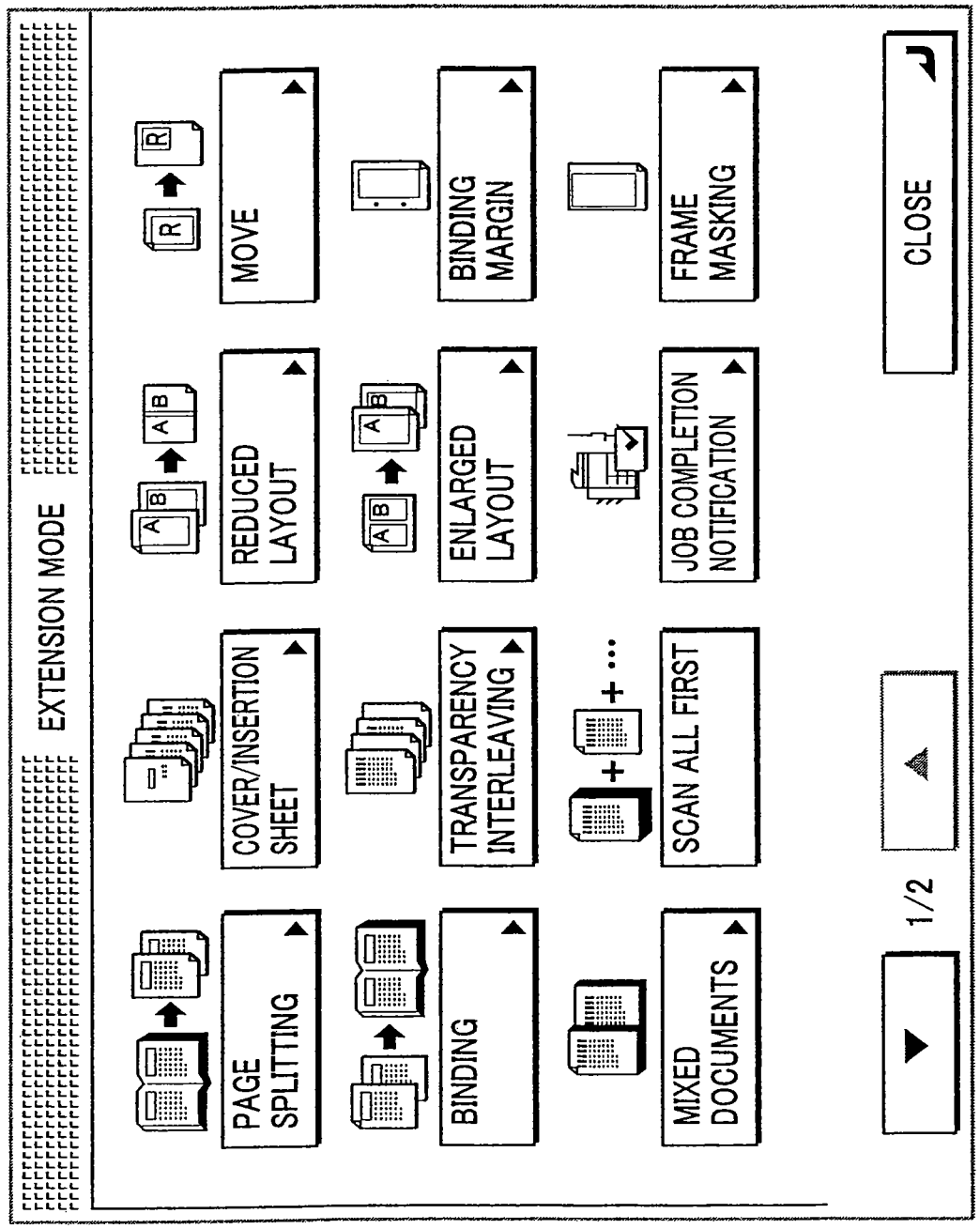

For example, a page split key on the user interface screen shown in FIG. 24B is used to select a mode in which one page of input document data is split at the vertical center line of the original document page into two pages and each of the resultant two pages is printed on a separate sheet. A cover/insertion sheet key on the same screen is a command key to select a mode in which special sheets such as cover sheets or insertion sheets are inserted at specified pages of input document data, thereby outputting a set of printed sheets including inserted special sheets. A reduced layout key on the same screen is a command key to select a mode in which an arbitrarily selected number of pages (selected from candidate numbers of pages, such as 2 pages, 4 pages, 8 pages, 9 pages, and 16 pages) are printed on one side of a sheet in such a manner that respective pages are reduced and resultant reduced images are arranged in a specified form. A move key is a command key to select a mode in which input document data is printed at a shifted position. A binding key is a command key to select a mode in which a plurality of input document pages are printed and resultant printed pages are bound into a single piece. A transparency interleaving key is a command key to select a mode in which respective pages of input document data are printed on transparencies and normal sheets, and resultant transparencies and normal sheets are alternately placed. An enlarged layout key is a command key to select a mode in which one page of input image is divided into a plurality of images and the resultant respective images are enlarged by a proper factor and printed on different sheets. A binding margin key is a command key to select a mode in which input document data is printed on a sheet such that A mixed documents key is a command key to select a mode in which plural sets of document data, which are different in type, for example, a set of document data with a size of A4 and a set of document data with a size of A3, are processed in a single job. A scan-all-first key is a command key to select the scan-all-first mode described above with reference to specific embodiments. A job completion notification key is a command key to select a mode in which when a job of output process is completed, the apparatus notifies users of the fact that the job is completed. A frame masking key is a command key to select a mode in which input document data is printed such that no printing is performed in a particular area with a specified width at a specified position. As described above, users can arbitrarily select one or more desired processing modes via the user interface screen shown in FIG. 24B. The present embodiment also has other processing modes such as a staple mode or a double-sided mode in addition to those displayed on the user interface screen shown in FIG. 24B. Such modes can be selected via another user interface screen (not shown). If the controller 110 detects that a processing mode has been selected by a user via a user interface screen, the controller 110 controls the apparatus so as to perform a process in the selected processing mode. Note that the user can an arbitrary number of processing modes via one or more user interface screens. That is, one or more processing modes can be set for a particular job. However, in the case in which a plurality of processing modes are set for one job, only combinations of plural processing modes which are consistent and do not collide with each other are allowed. For example, a combination of the double-sided mode and the staple mode or a combination of the reduced layout mode and the double-sided mode are allowed, but any combination which are inconsistent or collide with each other is not allowed. More specifically, some command keys are displayed in a shaded fashion and are disabled, if necessary, so that users cannot select an unallowable combination. For example, a combination of the reduced layout mode and the enlarged layout mode, a combination of the mixed document mode and the binding mode, etc., are not allowed. The control of enabling or disabling combinations of processing modes is performed on the basis of information associated with respective processing modes described in a table and stored in a memory.

If the controller 110 detects that a processing mode is set by a user via a user interface screen such as the extension screen shown in FIG. 24B, the controller 110 controls the control unit 150 to display a user interface screen in which information indicating the processing mode set by the user is displayed. For example, if the scan-all-first key on the extension screen shown in FIG. 24B is pressed by a user, the controller 110 displays a user interface screen, such as that shown in FIG. 24C, in which information indicating that the scan-all-first mode has been selected is displayed in an area 2401 of the user interface screen.

Herein, after the scan-all-first mode is selected by the user via the extension screen shown in FIG. 24B, if a subset of document sheets to be processed in the scan-all-first mode is put on the ADF or one of the subset of document sheets is put on the platen glass and further the start key on the control unit 150 (not shown) is pressed by the user, the controller 110 controls the reader unit 200 to start the process of inputting the document data of the subset of document sheets in the scan-all-first mode and sequentially stores the document data acquired via the reader unit 200 on the hard disk of the image storage unit 160. If the subset of document sheets to be input in the present input process has all been input, the controller 110 switches the state of the apparatus into the intermediate state in the scan-all-first mode. In this intermediate state in the scan-all-first mode, the controller 110 displays an intermediate user interface screen, such as that shown in FIG. 25, which is different from that shown in FIG. 7 or that shown in FIG. 17, on the control panel of the control unit 150. In the present embodiment, as shown in FIG. 25, the user interface screen 2501 for use in intermediate states in the scan-all-first mode is displayed in a pop-up fashion or the like in which the intermediate user interface screen 2501 overlaps an existing user interface screen 2500, such as the initial user interface screen or a user interface screen, such as that shown in FIG. 6, which notifies the user that the process is in the scan-all-first mode, thereby allowing the user to easily perform the operation.

The user interface screen 2501 for use in intermediate states in the scan-all-first mode includes a guidance display area for displaying guidance information indicating an operation to be performed by users, such as a message "Ready to Scan Documents. Replace Documents and Press the Start Key" (2502). The user interface screen 2501 also includes status display areas for displaying the status of the apparatus, such as a display area 2503 for displaying the available memory capacity (99% in the example shown in FIG. 25) and an area in which a message "Waiting for a Scan Start Command" is displayed. The user interface screen 2501 also includes parameter display areas such as a display area 2504 in which, in the specific example shown in FIG. 25, information indicating that the specified scaling factor is 100% and the specified size of output sheets is A4 is displayed; a display area 2512 in which, in the present example, information indicating that the specified number of output sheets is 1 and the specified number of copies is 1 is displayed; a display area 2505 in which, in the present example, information indicating that the scanning intensity level is automatically adjusted is displayed; and a display area 2506 in which, in the present example, information indicating that the specified document type is text is displayed.

Furthermore, the user interface screen 2501 for use in intermediate states in the scan-all-first mode allows the user to change the setting in terms of the number of sheets to be output and the number of copies to be output via the display area 2512, and also allows the user to change the scanning intensity level by using the key 2505. Furthermore, it is possible to change the setting in terms of the document type via the display area 2506. That is, those display areas functions not only to display information indicating the current processing conditions but also to allow users to change the processing conditions. As described above, the user interface screen 2501 includes command keys for changing processing conditions currently set for a job to be processed in the scan-all-first mode.

Furthermore, the user interface screen 2501 for use in intermediate states in the scan-all-first mode also includes a display area 2507. This display area 2507 includes a command key 2508 and a command key 2509. By pressing the command key 2508 in an intermediate state in the scan-all-first mode, the user can specify the sheet insertion mode for a job to be processed in the scan-all-first mode. On the other hand, by pressing the command key 2509 in an intermediate state in the scan-all-first mode, the user can specify the composite-with-form mode, which has been described earlier in the second embodiment, for a job to be processed in the scan-all-first mode. That is, the user interface screen 2501 also includes command keys for setting new conditions, in addition to the above described command keys for changing the current processing conditions. If the key 2508 is pressed by a user, the controller 110 controls the apparatus so as to perform processing in a similar manner as described in the first embodiment. On the other hand, if the key 2509 is pressed by a user, the controller 110 controls the apparatus so as to perform processing in a similar manner as described in the second embodiment. The manner in which the user interface screen is switched in response to pressing one of those keys and the manner in which the controller 110 controls the apparatus in response to pressing one of those keys are similar to those described above in the first or second embodiment with reference to the flow charts and figures, and thus a further description thereof is not given herein.

Furthermore, the display area 2507 in the user interface screen 2501 for use intermediate states in the scan-all-first mode also includes keys 2510 and 2511. The key 2510 functions as a condition display key indicating whether the double-sided print mode or the single-sided print mode is currently set for a job to be processed in the scan-all-first mode, and the key 2510 also functions as a condition change key which allows users to switch the print mode assigned to a job to be processed in the scan-all-first mode in such a manner that when the double-sided print mode is currently set, the print mode is switched to the single-sided print mode in response to pressing the key 2510 while the print mode is switched to the double-sided print mode if the key 2510 is pressed when the current print mode is the single-sided print mode.

The key 2511 functions as a new-condition setting key which allows a user to set, in an intermediate state in the scan-all-first mode, an extension mode for a job to be processed in the scan-all-first mode. When the user interface screen shown in FIG. 24A is displayed before the reader unit 200 started the inputting of a set of document data in the scan-all-first mode, if an extension mode is selected by a user by pressing the extension key 2400 on the user interface screen shown in FIG. 24A, the key 2511 on the user interface screen shown in FIG. 25 may be displayed in a highlighted fashion (in a different color such as blue) so that the user can understand that the extension mode has already been set. If the key 2511 on the user interface screen 2501 is pressed by a user in an intermediate state in the scan-all-first mode, the controller 110 controls the control unit 150 so as to switch the screen displayed on the display panel of the control unit 150 from the user interface screen 2501 being currently displayed to the user interface screen shown in FIG. 24B thereby allowing a user to set, in an intermediate state in the scan-all-first mode, a desired extension mode for a job to be processed in the scan-all-first mode. If an extension mode is set via the user interface screen shown in FIG. 24B in an intermediate state in the scan-all-first mode, the controller 110 controls various relating units in a similar manner to the manner described earlier with reference to FIG. 15, although a further description is not given herein. If the close key is pressed by the user after a desired extension mode is selected on the user interface screen shown in FIG. 24B in the intermediate state in the scan-all-first mode, the controller 110 describes information indicating the processing conditions associated with the extension mode selected via the user interface screen, in the page table associated with the job to be performed in the scan-all-first mode such as that shown in FIG. 12 or 20. The controller 110 then switches the user interface screen displayed on the display panel of the control unit 150 from the user interface screen shown in FIG. 24B to a user interface screen shown in FIG. 25. Thereafter, the controller 110 controls the respective units so as to correctly perform processing in accordance with the page table described above.

In the present embodiment, the user interface screen such as that shown in FIG. 25 is provided in an intermediate state in the scan-all-first mode thereby allowing a user to make settings associated with various processing conditions in the extension mode, such as "page split", "cover/insertion sheet", "reduced layout", "move", "binding", "transparency interleaving", "enlarged layout", "binding margin", "mixed documents", "job completion notification", "frame masking", and "stapling", in addition to the sheet insertion mode and the composite-with-form mode.

This not only provides advantages similar to those provided by the first or second embodiment described above, but also makes it possible to deal with a wider variety of demands issued by users.

As described above, the user interface screen 2501 shown in FIG. 25, displayed by the controller 110 on the display of the control unit 150 in intermediate states in the scan-all-first mode, includes various display elements of different types. The user interface screen 2501 shown in FIG. 25 is displayed on the display of the control unit 150 under the control of the controller 110 on the basis of display data stored in the memory disposed in the apparatus, status data which indicates the operation status of the apparatus and which is supplied from various sensors, and data indicating processing condition parameters set by the user. Display elements of different types may all be included in a single user interface screen as with the user interface screen 2501 shown in FIG. 25, some display elements may be displayed on a different screen, or the respective display elements may be displayed in units of types such that display elements of each type are displayed on a single user interface screen. Display elements may be displayed in any manner, as long as the purposes described above can be achieved.

Figure 26B:
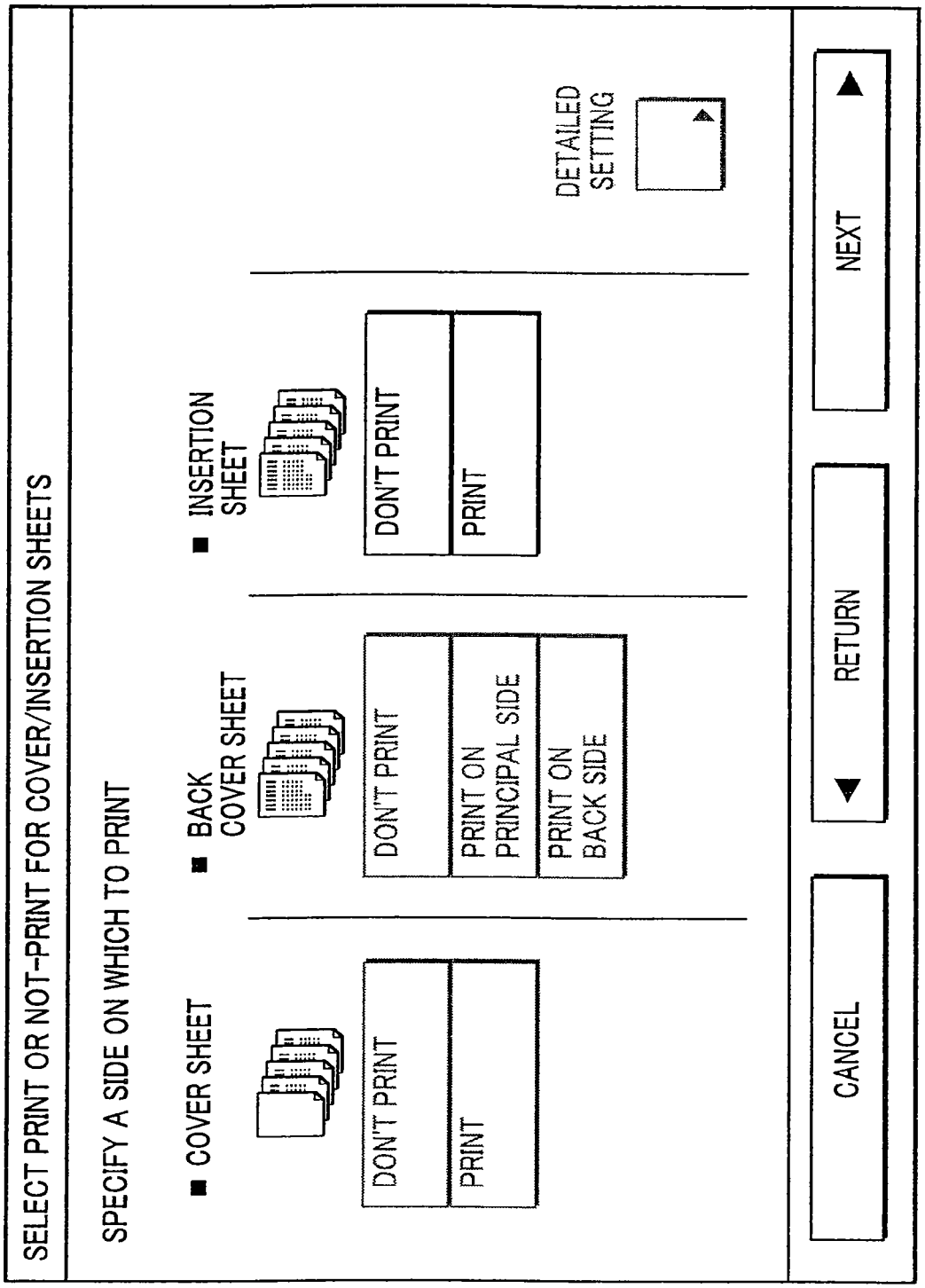

FIG. 26A to 26C show some examples of user interface screens which are modifications to those described above. Those user interface screens shown in FIGS. 26A to 26C are also displayed, under the control of the controller 110, on the control panel of the control unit 150. Those user interface screens shown in FIGS. 26A to 26C are displayed when the key 704 on the user interface screen shown in FIG. 7, described earlier in the first embodiment, is pressed by a user or when the key 2508 on the user interface screen shown in FIG. 25 is pressed by a user. If the key 704 or the key 2508 is pressed by the user, the controller 110 switches the user interface screen displayed on the control panel of the control unit 150 to the user interface screen shown in FIG. 26A. On the user interface screen shown in FIG. 26A, the user can select the type of a sheet to be inserted, from a cover sheet, a back cover sheet, and an insertion sheet/chapter sheet. This user interface screen also includes command keys used to select a sheet feeder for supplying the selected type of sheets. If setting is performed by a user by pressing some keys on the user interface screen shown in FIG. 26A, the controller 110 switches the user interface screen displayed on the control panel of the control unit 150 from the user interface screen shown in FIG. 26A to a user interface screen shown in FIG. 26B. The user interface screen shown in FIG. 26B includes command keys for use by users to specify whether or not to print on the sheet selected via the user interface screen shown in FIG. 26A. If setting is performed by a user via the user interface screen shown in FIG. 26B, the controller 110 switches the user interface screen displayed on the control panel from the user interface screen shown in FIG. 26B to a user interface screen shown in FIG. 26C. The user interface screen shown in FIG. 26C includes a selection table which allows a user to specify output pages at which the sheets selected in FIG. 26A should be inserted.

Figure 11:
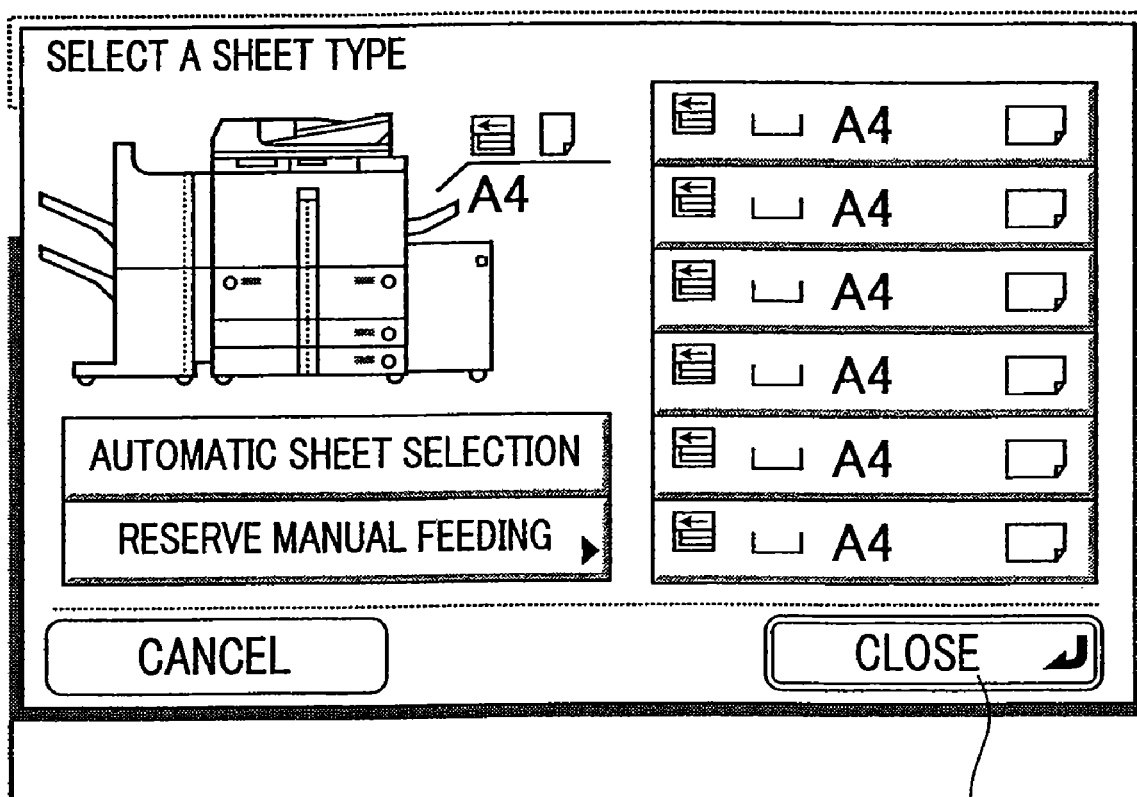
FIG. 11 is a diagram showing an example of a user interface screen according to an embodiment of the present invention.

The user interface screen shown in FIG. 26A includes those functions provided by the user interface screen shown in FIG. 10 according to the first embodiment and may be used instead of the user interface screen shown in FIG. 10 or 11. The user interface screen shown in FIG. 26B includes those functions provided by the user interface screen shown in FIG. 8 according to the first embodiment and may be used instead of the user interface screen shown in FIG. 8. The user interface screen shown in FIG. 26C includes those functions provided by the user interface screen shown in FIG. 9 according to the first embodiment and may be used instead of the user interface screen shown in FIG. 9.

Figure 27A:
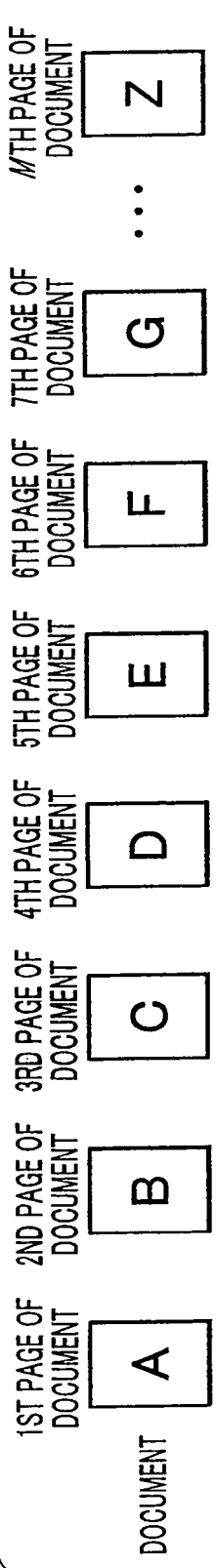
FIGS. 27A, 27B, and 27C are diagrams showing sample inputs and output sheets mode according to an embodiment of the present invention.
Figure 27B:
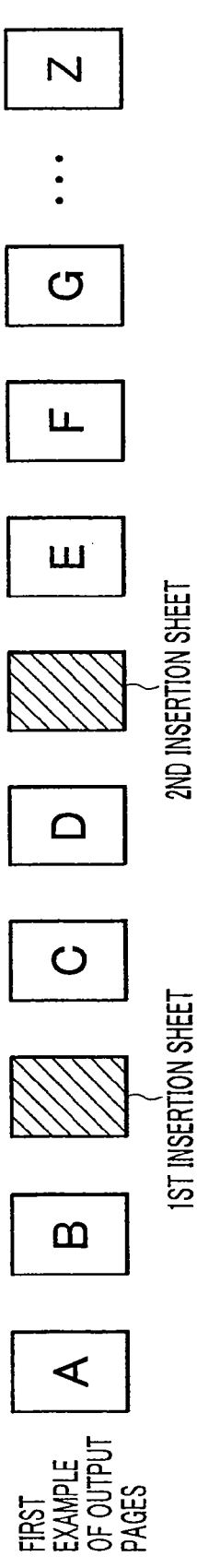
Figure 27C:
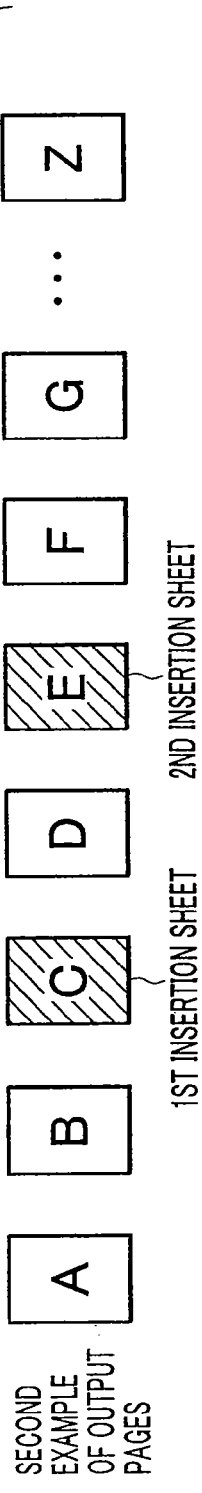

As described above, instead of using user interface screens shown in FIGS. 8 to 11 described in the first embodiment, the user interface screens shown in FIGS. 26A to 26C may be employed as user interface screens for use by users to make settings, in intermediate states in the scan-all-first mode, in terms of processing conditions associated with insertion sheet insertion for a job to be processed in the scan-all-first mode. This allows a user to make settings for a job of a set of document data to be processed in the scan-all-first mode such that a sheet of a type specified by the user is inserted at a page position specified by the user in an output form specified by the user, as shown in FIG. 27. If settings associated with the sheet insertion mode are performed in the manner described above with reference to FIGS. 26 and 27, page positions at which to insert sheets can be arbitrarily specified without being limited to a page immediately previous to or following a page given in an intermediate state as in the first embodiment.

In the above-described examples of processing in the scan-all-first mode, in intermediate states before the output process for a set of input document data is started, various processing conditions are set for the set of document data to be processed as a single job, and the process is performed so as to satisfy the specified processing conditions. However, the present invention is not limited to those examples. Alternatively, for example, a user interface screen similar to one of those employed in the above-described examples may be displayed on the control panel of the control unit 150 at an arbitrary time, which may be in an intermediate state, as a matter of course, in a period from a time at which inputting of a set of document data in the scan-all-first mode is started to a time at which an output process for the set of document data to be processed as a single job in the scan-all-first mode is started, and processing may be performed in accordance with the settings. More specifically, for example, the controller 110 monitors the elapsed time since the start of the input process of a set of document data in the scan-all-first mode. If the controller 110 detects that the elapsed time has reached a particular value, the controller 110 displays a user interface screen similar to one of those employed in intermediate states in the above examples. Alternatively, in the input process of a set of document data in the scan-all-first mode, if it is detected that a predetermined number of pages of document sheets have been input, a user interface screen is displayed. Alternatively, there may be provided a user interface on the control unit so as to allow a user to make settings asynchronously with and independently of the operation of any unit, such as the input operation of the reader unit 200, the printing operation of the printer unit 300, and the storage operation of the image storage unit 160 regardless of the operation status of the apparatus, such as the status of the input process performed by the reader unit 200 or the status of the print process performed by the printer unit 300. Also, a user interface on the control unit may make setting asynchronously with and independently of the operation of one of those units, for example, asynchronously with and independently of the operation of the printer unit 300, or asynchronously with and independently of the operations of two or more units, for example, asynchronously with and independently of the input operation of the reader unit 200 and the printing operation of the printer unit 300, thereby allowing the apparatus or the system to be controlled in a similar fashion as described above. For example, a particular key is disposed on the control unit, and if this key is pressed by a user, the controller 110 displays a user interface screen similar to one of those employed in intermediate states in the embodiments described above, regardless of the operation status of units such as the reader unit 200 and the printer unit 300, to allow the user to make settings associated with processing conditions for a job to be processed in the scan-all-first mode.

In the present invention, the apparatus may operate not only in a copy mode, but also in other modes such as a print mode in which data received from en external computer is printed. When the apparatus operates in the print mode, the operation may be performed in an input-all-first mode corresponding to the scan-all-first mode described above. In an alternative embodiment which is advantageous in particular in the print mode, a user interface screen similar to one of those employed in intermediate states in the scan-all-first mode according to the previous embodiments is displayed on a host computer under the control of an operating system or driver software or application software, running on the host computer thereby allowing the process to be controlled by the computer or the image forming apparatus in a similar manner as described above.

As for the hardware structure of the image input/output apparatus according to the present invention, the respective units such as the reader unit 200, the image storage unit 160 including the hard disk, or the printer unit 300 may be disposed within the image input/output apparatus or may be disposed in another apparatus or system in a separate fashion. In any case, the present invention may be applied. The image input/output apparatus according to the present invention may be capable of performing only one input process of a plurality of input processes including image data inputting from the reader unit 200 and image data inputting from an external apparatus via an external device interface, or may be capable of performing a plurality of input processes. If the image input/output apparatus is capable of processing at least one of such input processes, the scan-all-first mode according to the present invention may be applied. The image input/output apparatus according to the present invention may be capable of performing only one output process of a plurality of output processes including printing using the printer unit 300, storing in boxes on the hard disk of the image storage unit, data transferring to an external apparatus via an external device interface, or may be capable of performing a plurality of output processes. If the image input/output apparatus is capable of processing at least one of such output processes, the scan-all-first mode according to the present invention may be applied.

In the first and second embodiments described above, the operations in the sheet insertion mode and the composite-with-form mode have been mainly described, because the present invention is advantageous in particular in the sheet insertion mode and also in the composite-with-form mode. By applying the present invention to the sheet insertion mode or the composite-with-form mode, it becomes easier for users to make settings in terms of processing conditions in particular those directly influenced by input document data, such as at which input document page an insertion sheet should be inserted or which page of document data should be combined with a form image. The advantages of the present invention are great in particular when there are a large number of document sheets to be processed, because users can easily and correctly specify processing conditions via a user interface screen provided in an intermediate state in the scan-all-first mode without having to have detailed knowledge about documents. In any mode other than the sheet insertion mode or the composite-with-form mode, if it is required to make settings relating to page information of documents, the present invention can be advantageously applied such that a user interface screen is displayed in an intermediate state in the scan-all-first mode thereby allowing users to make settings. Furthermore, in any mode in which it is required to input information identifying a document page as one of processing conditions, as is the case in the sheet insertion mode, the composite-with-form mode, or a numbering mode, in which printing is performed such that a page number is printed on each page, the controller 110 may provide a user interface screen in an intermediate state to allow users to make settings.

As described above with reference to the first and second embodiments and also other embodiments, the purpose of the present invention is to provide a technique associated with processing, controlling, and displaying which can solve the problems in the conventional techniques described earlier. To achieve the above purpose, the present invention provides an image input/output apparatus and an image input/output system capable of performing processing in the scan-all-first mode, and a control method and a data processing method for user in such an image input/output apparatus and an image input/output system. The present invention also provides a method of setting a processing condition, a method for operation, a method of displaying a user interface screen, and a method of controlling displaying a user interface screen, thereby providing a user interface which allows a user to make various necessary settings in the scan-all-first mode.

Thus, the present invention makes it possible for a user to operate the apparatus or the system without having to complicated and troublesome operations even for a job processed in the scan-all-first mode. Furthermore, even in a processing mode in which a user has to correctly set processing conditions depending on the content and/or the state of documents to be processed, the user does not need to know all details of the documents before the process is started by the apparatus and does not need to set all processing conditions before the process is started. Even in a case in which there are a large number of documents to be processed, the user can easily make settings without having to know all details of processing conditions before the start of the process. That is, a job can be output in a desired output form under specified conditions without having to know all details of documents and without having to make settings of all conditions before the process is started. The advantages are great in particular when there are a large number of documents to be processed. Furthermore, in a processing mode in which a user has to correctly set processing conditions depending on the content and/or the state of documents to be processed, very great advantages can be obtained. In such a processing mode, a job including a large number of documents can be output in a very high efficient manner. In processing in the sheet insertion mode or the composite-with-form mode according to the present invention, unlike the conventional technique, a user can make setting of processing conditions in the sheet insertion mode or the composite-with-form mode in the middle of the process, in an intermediate state in the scan-all-first mode, for example, without having to make setting of all conditions before the process is started. More specifically, in the case of the sheet insertion mode, the user can issue a sheet insertion execution command in the middle of process and can specify conditions in the sheet insertion mode, such as the type of sheets to be inserted, page positions at which to insert the sheets, and necessity of printing on the sheets. In the case of the composite-with-form mode, the user can issue a composite-with-form execution command in the middle of process, and can specify conditions in the composite-with-form mode, such as selection of a form image, and a position at which to place the form image. When there are a large number of document sheets to be processed in such a mode, the process can be performed in an easy fashion without necessitating that the user performs complicated or troublesome operations. Even in a mode in which settings of processing conditions should be correctly made and confirmed as in the sheet insertion mode or the composite-with-form mode, and various extension modes selectable via the user interface screen shown in FIG. 24B, similar great advantages can be obtained. When a job including a large number of documents is output in such a mode, the output process can be correctly performed without necessitating that the user should do troublesome operations, and thus great advantages are obtained. Furthermore, after inputting of data is started, if a user notices that a necessary processing condition has not been set for the job or a processing condition has been incorrectly set, the user can newly set a condition or correct a wrong setting in an intermediate state. This prevents data from being output in an undesirable form, which can occur in the conventional technique. This is another great advantage provided by the present invention.

Although in the embodiments described above, a user interface screen is presented in an intermediate state at a proper time after the inputting of document data in the scan-all-first mode is started, thereby allowing a user to make settings of processing conditions for the job to be output in the scan-all-first mode, a user interface screen similar to one of those shown in FIGS. 24A, 24B, 14, and 15 may be displayed in an initial state before the start of the inputting of document data in the scan-all-first mode, thereby allowing the user to make setting of processing conditions in various modes such as the sheet insertion mode or the composite-with-form mode. The use may select whether setting is performed in the initial state before the start of the inputting of the document data in the scan-all-first mode or at a proper time after the start of the inputting of the document data in the scan-all-first mode.

Although in the embodiments described above, the image forming apparatus is assumed to print by means of electrophotography, other techniques such as ink-jet printing, thermal transfer printing, thermal printing, or electrostatic printing may also be employed.

The present invention can be applied not only to an apparatus installed in a separate fashion but also to a system including a plurality of apparatuses or a system in which a plurality of apparatuses are connected with each other via data communication medium or a network such as LAN or a system including a host computer and a printer or a system including a plurality of host computers and a printer.

Furthermore, the present invention can be applied not only to a single-function apparatus or system such as an apparatus having only a copying function but also to a multifunction apparatus or system having two or more functions such as a copying function, a facsimile function, a box function, and a printer function.

The present invention may be applied to a singly-installed independent apparatus and also to a system including a plurality of apparatuses. The present invention may also be practiced by supplying a medium such as a storage medium having a software program code stored therein to an apparatus, loading the software program code from the medium onto a computer (or a CPU or an MPU) of a system or an apparatus, and executing the software program on the computer.

In this case, the program code stored on the storage medium implements the functions disclosed in the embodiments described above, and the storage medium on which the program code is stored falls within the scope of the present invention. Specific examples of such storage medium for supplying the program code include a floppy disk, a hard disk, an optical disk, a magnetooptical disk, a CD-ROM disk, a CD-R disk, a magnetic tape, a nonvolatile memory card, and a ROM. The software program code may also be supplied by means of downloading via a network.

When one or more functions according to one of or a mixture of above-described embodiments according to the present invention are realized by executing the program code on a computer, the operating system (OS) running on the computer may execute all or part of the process in accordance with the program code. Note that the realization in such a manner also falls within the scope of the present invention.

Furthermore, one or more functions according to one of or a mixture of above-described embodiments according to the present invention may be realized in such a manner that a program code is loaded from a medium such as a storage medium into a memory on an extension board inserted in a computer or into a memory in an extension unit connected to a computer, and a CPU provided on the extension board or in the extension unit executes all or part of the process in accordance with the program code. The realization in such a manner also falls within the scope of the present invention.

As described above, the present invention solves the problems in the conventional techniques and makes it possible for a user to easily and correctly make settings as desired by the user for a job to be processed in the scan-all-first mode in a variety of different without having to perform troublesome setting operations. Furthermore, even in a processing mode in which a user has to correctly set processing conditions depending on the content and/or the state of documents to be processed, the user does not need to know all details of the documents before the process is started by the apparatus without having to know all details of processing conditions before the start of the process. Even in a case in which there are a large number of documents to be processed, the user can easily make settings without having to know all details of processing conditions before the start of the process. That is, a job can be output in a desired output form under specified conditions without having to know all details of documents and without having to make settings of all conditions before the process is started. The advantages are great in particular when there are a large number of documents to be processed. Furthermore, in a processing mode in which a user has to correctly set processing conditions depending on the content and/or the state of documents to be processed, very great advantages can be obtained. In such a processing mode, a job including a large number of documents can be output in a very high efficient manner. In processing in the sheet insertion mode or the composite-with-form mode according to the present invention, unlike the conventional technique, a user can make setting of processing conditions in the sheet insertion mode or the composite-with-form mode in the middle of the process (in an intermediate state in the scan-all-first mode, for example) without having to make setting of all conditions before the process is started. More specifically, in the case of the sheet insertion mode, the user can issue a sheet insertion execution command in the middle of process and can specify conditions in the sheet insertion mode, such as page positions at which to insert the sheets, and necessity of printing on the sheets. In the case of the composite-with-form mode, the user can issue a composite-with-form execution command in the middle of process, and can specify conditions in the composite-with-form mode, such as selection of a form image, and a position at which to place the form image. When there is a large number of document sheets to be processed, the process can be performed in an easy fashion without necessitating that the user performs complicated or troublesome operations. Even in a mode in which settings of processing conditions should be correctly made and confirmed as in the sheet insertion mode or the composite-with-form mode (and various extension modes selectable via the user interface screen shown in FIG. 24B), similar great advantages can be obtained. When a job including a large number of documents is output in such a mode, the output process can be correctly performed without necessitating that the user should do troublesome operations, and thus great advantages are obtained. Furthermore, after inputting of data is started, if a user notices that a necessary processing condition has not been set for the job or a processing condition has been incorrectly set, the user can newly set a condition or correct a wrong setting in an intermediate state. This prevents data from being output in an undesirable form, which can occur in the conventional technique. This is another great advantage provided by the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image input/output apparatus comprising:
an input unit configured to input a plurality of sets of document data;
a determining unit configured to determine whether an input process for the plurality of sets of document data is ended;
an output unit configured to output the plurality of sets of document data input by said input unit, as a single group of data, if said determining unit determines that the input process for the plurality of sets of document data is ended;
a setting unit configured to set a condition for outputting the plurality of sets of document data, including a first set of document data and a second set of document data, in a sheet insertion mode where the condition is set during a period between when said input unit finishes inputting the first set of document data and when said input unit begins inputting the second set of document data, and before said output unit outputs the plurality of sets of document data including the first set of document data and the second set of document data, wherein in the sheet insertion mode, on each print sheet at least one of the plurality of sets of document data inputted by said input unit is printed and a particular sheet is inserted between print sheets, and wherein said output unit outputs the plurality of sets of document data including the first set of document data and the second set of document data in the sheet insertion mode based on the condition set by said setting unit.

2. An image input/output apparatus according to claim 1, wherein said setting unit can change a condition already set by said setting unit.

3. The image input/output apparatus according to claim 1, wherein a type of the particular sheet that is inserted between the print sheets is selected from among an insertion sheet and a tab sheet.

4. An image input/output apparatus comprising:

an input unit configured to input a plurality of sets of document data;

a determining unit configured to determine whether an input process for the plurality of sets of document data is ended;

an output unit configured to output the plurality of sets of document data input by said input unit as a single group of data, if said determining unit determines that the input process for the plurality of sets of document data is ended;

a setting unit configured to set a condition for outputting the plurality of sets of document data, including a first set of document data and a second set of document data, in a composite-with-form mode where the condition is set during a period between when said input unit finishes inputting the first set of document data and when said input unit begins inputting the second set of document data, and before said output unit outputs the plurality of sets of document data including the first set of document data and the second set of document data, wherein in the composite-with-form mode, a particular form image is combined with at least one of the plurality of sets of document data input by said input unit, and wherein said output unit outputs the plurality of sets of document data including the first set of document data and the second set of document data in the composite-with-form mode based on the condition set by said setting unit.

5. An image input/output apparatus according to claim 4, wherein said setting unit can change a condition already set by said setting unit.

6. The image input/output apparatus according to claim 4, further comprising an image storage unit which stores a plurality of images, and wherein the particular form image is selected from among the plurality of images.

* * * * *